(12) United States Patent
Miwa

(10) Patent No.: US 9,710,047 B2
(45) Date of Patent: Jul. 18, 2017

(54) APPARATUS, SYSTEM, AND METHOD FOR VARYING A CLOCK FREQUENCY OR VOLTAGE DURING A MEMORY PAGE TRANSFER

(71) Applicant: FUJITSU LIMITED, Kawasaki-shi, Kanagawa (JP)

(72) Inventor: Masahiro Miwa, Shinagawa (JP)

(73) Assignee: FUJITSU LIMITED, Kawasaki (JP)

( * ) Notice: Subject to any disclaimer, the term of this patent is extended or adjusted under 35 U.S.C. 154(b) by 84 days.

(21) Appl. No.: 14/572,854

(22) Filed: Dec. 17, 2014

(65) Prior Publication Data

US 2015/0220129 A1 Aug. 6, 2015

(30) Foreign Application Priority Data

Feb. 5, 2014 (JP) ................. 2014-020561

(51) Int. Cl.
| | |
|---|---|
| G06F 1/00 | (2006.01) |
| G06F 1/32 | (2006.01) |
| G06F 13/00 | (2006.01) |
| G06F 15/167 | (2006.01) |
| G06F 13/24 | (2006.01) |

(Continued)

(52) U.S. Cl.
CPC ............ *G06F 1/324* (2013.01); *G06F 1/3228* (2013.01); *G06F 1/3296* (2013.01); *G06F 9/45533* (2013.01); *G06F 1/3206* (2013.01); *G06F 1/3234* (2013.01); *G06F 13/1657* (2013.01); *Y02B 60/1217* (2013.01); *Y02B 60/146* (2013.01)

(58) Field of Classification Search
CPC ...... G06F 1/3296; G06F 1/324; G06F 1/3206; G06F 13/1657; G06F 1/3234; G06F 1/3228; G06F 9/45533; Y02B 60/1217
USPC .................. 713/320, 322; 711/148; 709/216; 710/260
See application file for complete search history.

(56) References Cited

U.S. PATENT DOCUMENTS 5,564,015 A * 10/1996 Bunnell ................ G06F 1/3215
  713/340
5,613,071 A * 3/1997 Rankin ................ G06F 12/0284
  (Continued)

FOREIGN PATENT DOCUMENTS

| JP | 61-049268 | 3/1986 |
| JP | 8-30568 A | 2/1996 |

(Continued)

OTHER PUBLICATIONS

Venkatesh Pallipadi et al., "The Ondemand Governor", Intel Open Source Technology Center, Proceedings of the Linux Symposium, vol. Two, Jul. 19-22, 2006, Canada (18 pages).

(Continued)

*Primary Examiner* — Ji H Bae
(74) *Attorney, Agent, or Firm* — Fujitsu Patent Center

(57) ABSTRACT

An information processing apparatus connected to another information processing apparatus includes an arithmetic processing device, and one or more processors configured to detect an exception event of a self main memory when the arithmetic processing device requests an access to data on a main memory possessed by the another information processing apparatus and vary a clock frequency or a voltage of the arithmetic processing device on the basis of the detection of the exception event.

3 Claims, 20 Drawing Sheets

(51) Int. Cl.
*G06F 9/455* (2006.01)
*G06F 13/16* (2006.01)

(56) References Cited

U.S. PATENT DOCUMENTS

| | | | | |
|---|---|---|---|---|
| 5,742,843 | A | 4/1998 | Koyanagi et al. | |
| 6,049,853 | A * | 4/2000 | Kingsbury | G06F 12/1072 709/213 |
| 6,938,128 | B1 * | 8/2005 | Kuskin | G06F 12/0817 711/119 |
| 2002/0013889 | A1 * | 1/2002 | Schuster | G06F 12/1072 711/203 |
| 2004/0093390 | A1 * | 5/2004 | Oberdorfer | G06F 9/547 709/216 |
| 2005/0273571 | A1 * | 12/2005 | Lyon | G06F 9/45537 711/203 |
| 2009/0259861 | A1 * | 10/2009 | Tune | G06F 1/3203 713/320 |
| 2011/0004733 | A1 * | 1/2011 | Krakirian | H04L 49/90 711/147 |
| 2012/0054519 | A1 * | 3/2012 | Branover | G06F 1/3203 713/322 |
| 2012/0089852 | A1 * | 4/2012 | Muthukumar | G06F 1/3206 713/322 |
| 2013/0046967 | A1 * | 2/2013 | Fullerton | H03K 3/0315 713/100 |
| 2013/0311797 | A1 * | 11/2013 | Ahmad | G06F 1/3209 713/310 |

FOREIGN PATENT DOCUMENTS

| | | |
|---|---|---|
| JP | 2003-323334 | 11/2003 |
| JP | 2005-182103 | 7/2005 |
| JP | 2010-146474 A | 7/2010 |

OTHER PUBLICATIONS

Kohta Nakashima et al., "Design and Evaluation of a Virtual Machine Migration using RDMA Data Transfer Mechanism over 10Gb Ethernet", Journal of Information Processing Society of Japan, pp. 1-14, vol. 0, No. 0, Dec. 15, 2007. English Summary (14 pages).

Intel, "Enhanced Intel® SpeedStep® Technology for the Intel® Pentium® M Processor", White Paper, Mar. 2004, pp. 1-12 (12 pages).

Bhavyasree Unni et al., "An intelligent energy optimization approach for MPI based applications in HPC systems", CSIT, Original Research, Apr. 16, 2013 (7 pages).

Konstantinos Koukos, et al., "Towards More Efficient Execution: A Decoupled Access-Execute Approach", ICS '13, Uppsala University, Jun. 10-14, 2013 (10 pages).

Japanese Office Action dated Jun. 6, 2017 for corresponding Japanese Patent Application No. 2014-020561, with Partial English Translation, 4 pages.

* cited by examiner

FIG.5

| VIRTUAL ADDRESS | PAGE POSSESSING NODE | PHYSICAL ADDRESS |
|---|---|---|
| ... | ... | ... |
| 0x00000001421ab000000 | NODE A | 0x0000000085EE5A000 |
| 0x00000001421ab100000 | NODE B | 0x000000004E2352000 |
| ... | ... | ... |

( ASSUME 2 MB PAGE )

FIG.7

| PROCESSOR | TRANSITION TIME (WORST VALUE) |
|---|---|
| Intel Xeon X5570 | 10 μsec |
| AMD FX-8150 | 8 μsec |
| ... | ... |

$$D = M - M\left(\frac{1}{2}\right)^{\frac{t}{\tau}}$$

COUNT IS OBTAINED BY LEAST-SQUARES METHOD TO FIT TO ACTUAL COUNT VALUE AS FOLLOWS;

$(M, \tau) = (1.00 \times 10^5, 1.32)$

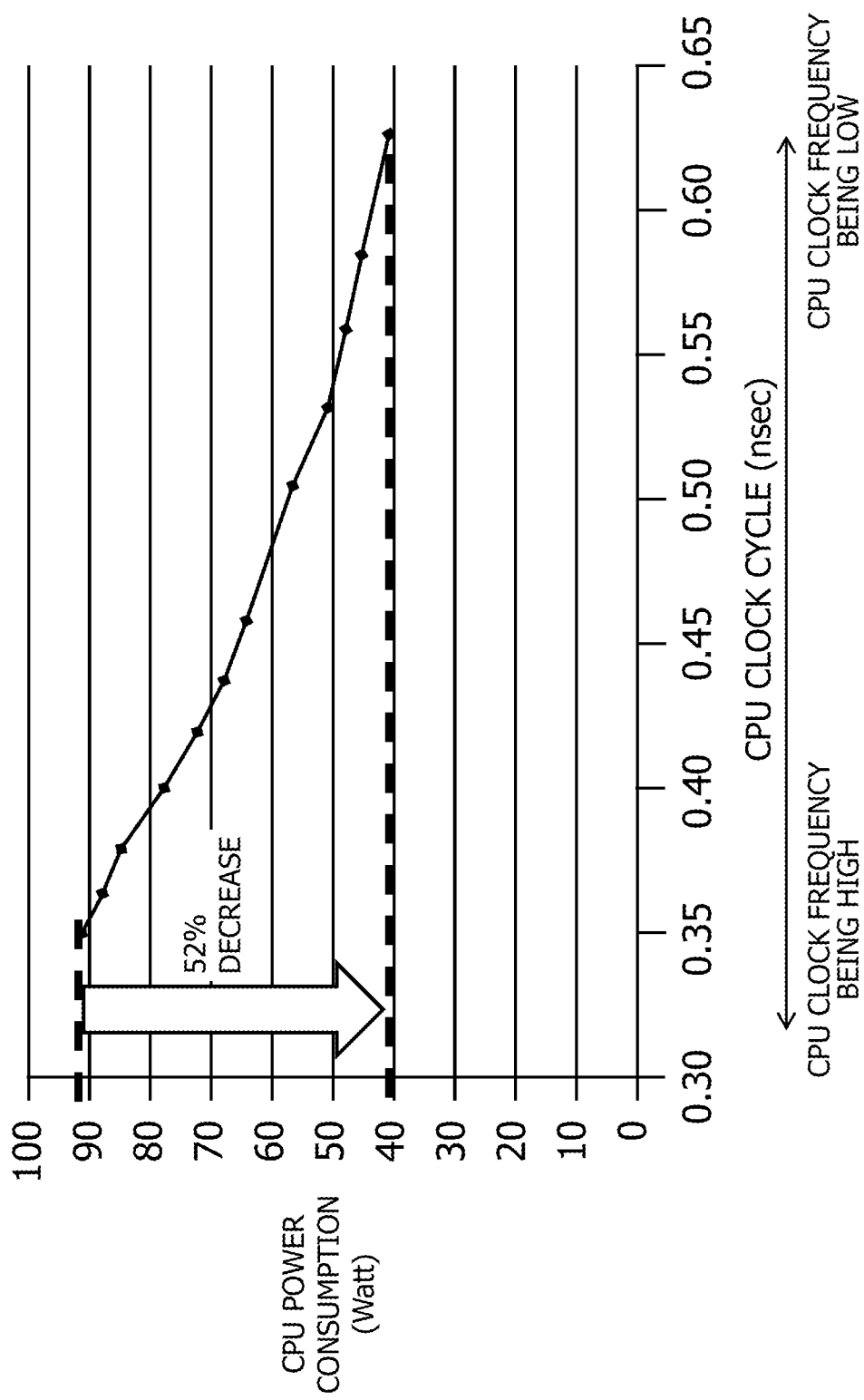

APPARATUS, SYSTEM, AND METHOD FOR VARYING A CLOCK FREQUENCY OR VOLTAGE DURING A MEMORY PAGE TRANSFER

CROSS-REFERENCE TO RELATED APPLICATION

This application is based upon and claims the benefit of priority of the prior Japanese Patent Application No.2014-020561, filed on Feb. 5, 2014, the entire contents of which are incorporated herein by reference.

FIELD

The embodiments discussed herein are related to an information processing apparatus, an information processing system and a control method for the information processing system.

BACKGROUND

In recent years, a cluster system to realize high availability and scalability has been introduced in preparation against a fault etc. of an information processing apparatus. The cluster system connotes a system operated as one single system on the whole by connecting a plurality of information processing apparatuses. This architecture enables the cluster system to distribute a load through the plurality of information processing apparatuses. Further, the cluster system enables, even if one information processing apparatus stops executing a process due to a fault, another information processing apparatus to continue the process. Moreover, the cluster system enables, when used as a server, the load to be distributed via the plurality of information processing apparatuses. The information processing apparatuses connected in the cluster system are called nodes. Each node includes a CPU (Central Processing Unit) serving as an arithmetic processing device and a memory serving as a main storage device. In the cluster system where communications are performed between the plural nodes, the CPU of a certain node may consume a futile amount of electric power while performing the communication for acquiring data on the memory of another node as the case may be. A period of communication time elongates in comparison to a period of arithmetic time of the CPU due to an enlargement in scale of the cluster system. Therefore, the CPU has a tendency to consume the electric power with futility.

A distributed shared memory system is given as one of methods for enabling the cluster system. In the distributed shared memory system, the plurality of nodes is connected via a network used for transferring data, etc. The network establishing connections between the plurality of nodes is called an "interconnect". The distributed shared memory system virtualizes the plurality of information processing apparatuses connected via the high-speed interconnect into one single information processing apparatus. Therefore, the distributed shared memory system can execute in parallel a multiplicity of threads each defined as an execution unit of a program. Furthermore, the distributed shared memory system shares memories being possessed by the respective nodes with the whole system and enables the memories to be accessed mutually from the CPUs of the individual nodes, thereby having an advantage that a large capacity memory can be utilized.

Herein, a process executed by the CPU of a certain node makes use of the memory as one memory space called a virtual address space. The virtual address space is managed in a unit called a page, and the process accesses a certain page and thus acquires data used for executing a program. At this time, such a case occurs that a physical memory which stores actual data of the page to be accessed by the node is not allocated to a local memory defined as the memory within the self-node. If the page to be accessed is not allocated to the local memory, an exception called a page fault occurs. When the page fault occurs, the CPU executes a process of acquiring the page to be accessed through a process called an exception process or an interrupt process. The information processing apparatus, if configured as a single apparatus, executes a process such as acquiring the page saved in a secondary storage device like an HDD etc. into the local memory. On the other hand, in a distributed shared memory system, a case exists, in which a page saved in the secondary storage device like the HDD etc. exists in a memory of another node, and data of this page are acquired from the another node. In order to acquire the data of the page from a remote memory defined as a memory of another node, a communication process occurs. During this communication process, the CPU expends some time for waiting till the communication will have been completed and, nevertheless, consumes futile electric power for operating at a high CPU clock frequency.

The power consumption of the CPU is proportional to a product of a square of a voltage and the clock frequency and can be therefore reduced by setting low the voltage and the clock frequency of the CPU. A DVFS (Dynamic Voltage and Frequency Scaling) mechanism is known as a technology for controlling the voltage and the clock frequency of the CPU. The CPU equipped with this DVFS mechanism may vary the voltage and the clock frequency. The clock frequency of the CPU will hereinafter be referred to as the CPU clock frequency.

[Patent document 1] Japanese Laid-Open Patent Publication No.S61-49268

[Patent document 2] Japanese Laid-Open Patent Publication No.2005-182103

[Patent document 3] Japanese Laid-Open Patent Publication No.2003-323334

[Non-Patent document 1] Venkatesh Pallipadi, Alexey Starikovskiy, "The Ondemand Governor", Canada, Proceedings of the Linux Symposium, July 19th-22nd, 2006, Volume Two

[Non-Patent document 2] Nakashima Kouta, Sato Mitsuru, Kumon Kouichi and Taniguchi Hideo, "Design and Evaluation of a Virtual Machine Migration using RDMA Data Transfer Mechanism over 10 Gb Ethernet", Research Journal of Information Processing Association of Japan, Computing System 48(SIG_18 (ACS_20)), 2007-12-15, p.69-82

[Non-Patent document 3] "Enhanced Intel(R) SpeedStep(R) Technology for the Intel (R) Pentium (R) M Processor", March 2004

[Non-Patent document 4] Bhavyasree Unni, Nazia Parveen, Ankit Kumar, B. S. Bindhumadhava, "An intelligent energy optimization approach for MPI based applications in HPC systems", CSI Publications 2013, p.2

[Non-Patent document 5] Konstantinos Koukos, David Black-Schaffer, Vasileios Spiliopoulos, Stefanos Kaxiras, "Towards More Efficient Execution: A Decoupled Access-Execute Approach", ICS'13, 2013, Uppsala University

SUMMARY

According to an aspect of the embodiments, an information processing apparatus connected to another information processing apparatus includes an arithmetic processing device, and one or more processors configured to detect an exception event of a self main memory when the arithmetic processing device requests an access to data on a main memory possessed by the another information processing apparatus and vary a clock frequency or a voltage of the arithmetic processing device on the basis of the detection of the exception event.

The object and advantages of the invention will be realized and attained by means of the elements and combinations particularly pointed out in the claims. It is to be understood that both the foregoing general description and the following detailed description are exemplary and explanatory and are not restrictive of the invention.

BRIEF DESCRIPTION OF THE DRAWINGS

FIG. 5 is a diagram illustrating a data structure of a translation table;

FIG. 7 is a diagram illustrating an example of a period of time for DVFS transition per processor;

FIG. 21 is a graph illustrating a power reduction effect by the DVFS.

DESCRIPTION OF EMBODIMENTS

In a distributed shared memory system, when a page fault occurs, a CPU transfers data of a page to be acquired to a local memory via an interconnect from a memory of another information processing apparatus. The transfer of the data of the page will hereinafter be termed a page transfer. A page transfer process entails exclusively using resources of the CPU as the case may be, resulting in power consumption being caused for a period of the transfer process. A status of exclusively using the resources of the CPU is called "busy waiting". When the CPU is in the busy waiting status, a usage rate of the CPU rises. A majority of CPUs in recent years, with the CPU clock frequency being set high when the CPU usage rate is high, increase in their power consumptions. However, during the busy waiting till the page transfer is completed, performance of the page transfer is not conspicuously improved even when the CPU clock frequency is high.

Figure 1:
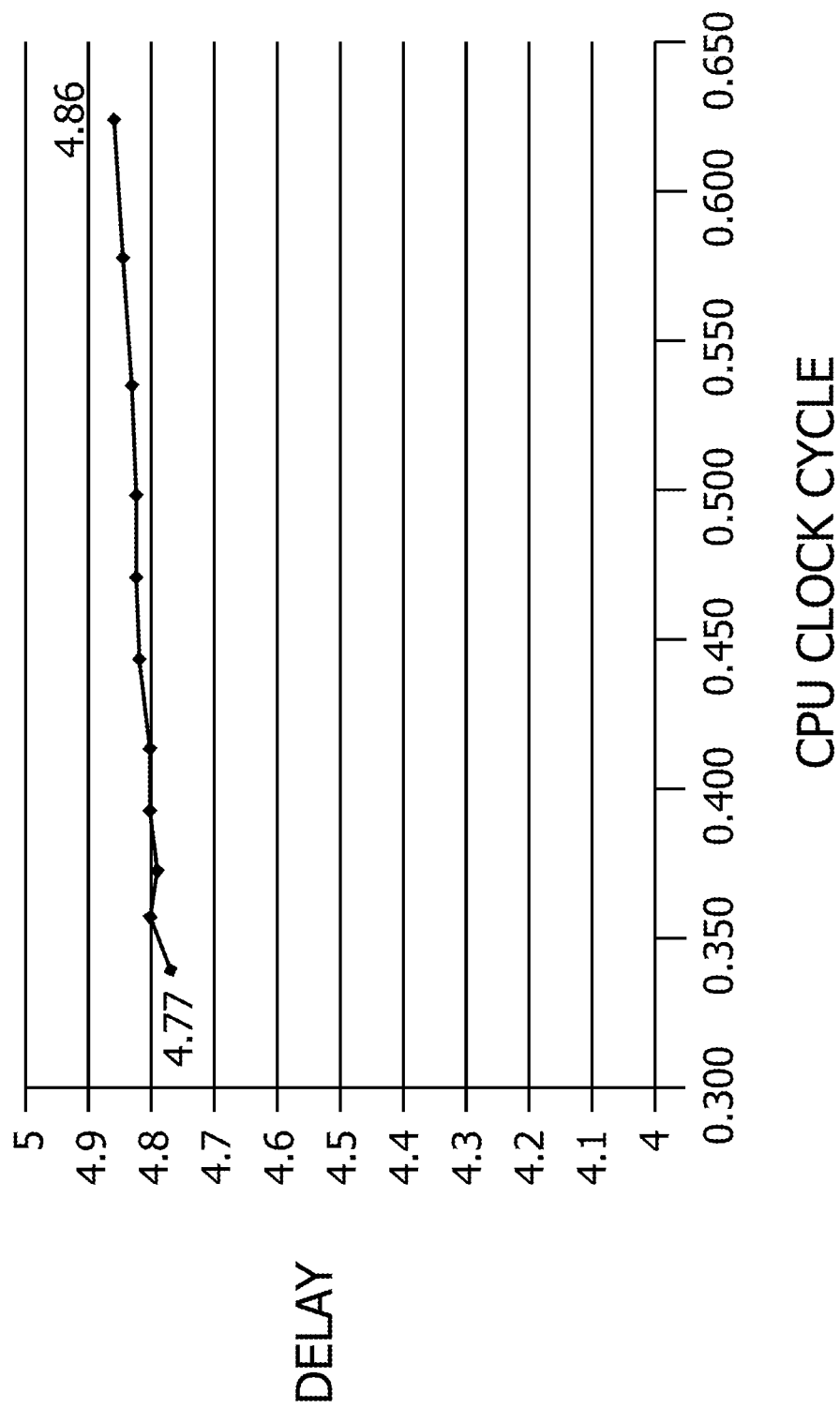
FIG. 1 is a graph indicating an interconnect delay time on one way when varying a CPU clock frequency.

A relationship between the CPU clock frequency and the performance of the CPU will be described by use of FIG. 1. FIG. 1 is a graph indicating the interconnect delay time on one way when varying the CPU clock frequency. Note that, in FIG. 1, units are omitted in both of the CPU clock frequency given along the axis of abscissa and a delay given along the axis of ordinate. Herein, the discussion will be made on the assumption that scales of the axis of abscissa and the axis of ordinate are indicated without the units in FIG. 1. Even when elongating a CPU clock cycle, i.e., setting low the CPU clock frequency, there is seen a slight extension of the interconnect delay time. In FIG. 1, when the CPU clock cycle is elongated by approximately 0.2, the interconnect delay time becomes 4.86 from 4.77. This value corresponds to an extension of about 1.8%. Namely, even when setting high the CPU clock frequency, it does not happen that the interconnect delay time becomes conspicuously short in comparison to a case of the CPU clock frequency being low. Accordingly, during the page transfer process, the performance is not expected to have an improvement even when setting high the CPU clock frequency, while such a problem arises that the power consumption increases.

An embodiment of the present application will hereinafter be described based on the drawings. A configuration of the following embodiment is an exemplification, and the present invention is not limited to the configuration of the embodiment.

<Architecture of Information Processing System>

Figure 2:
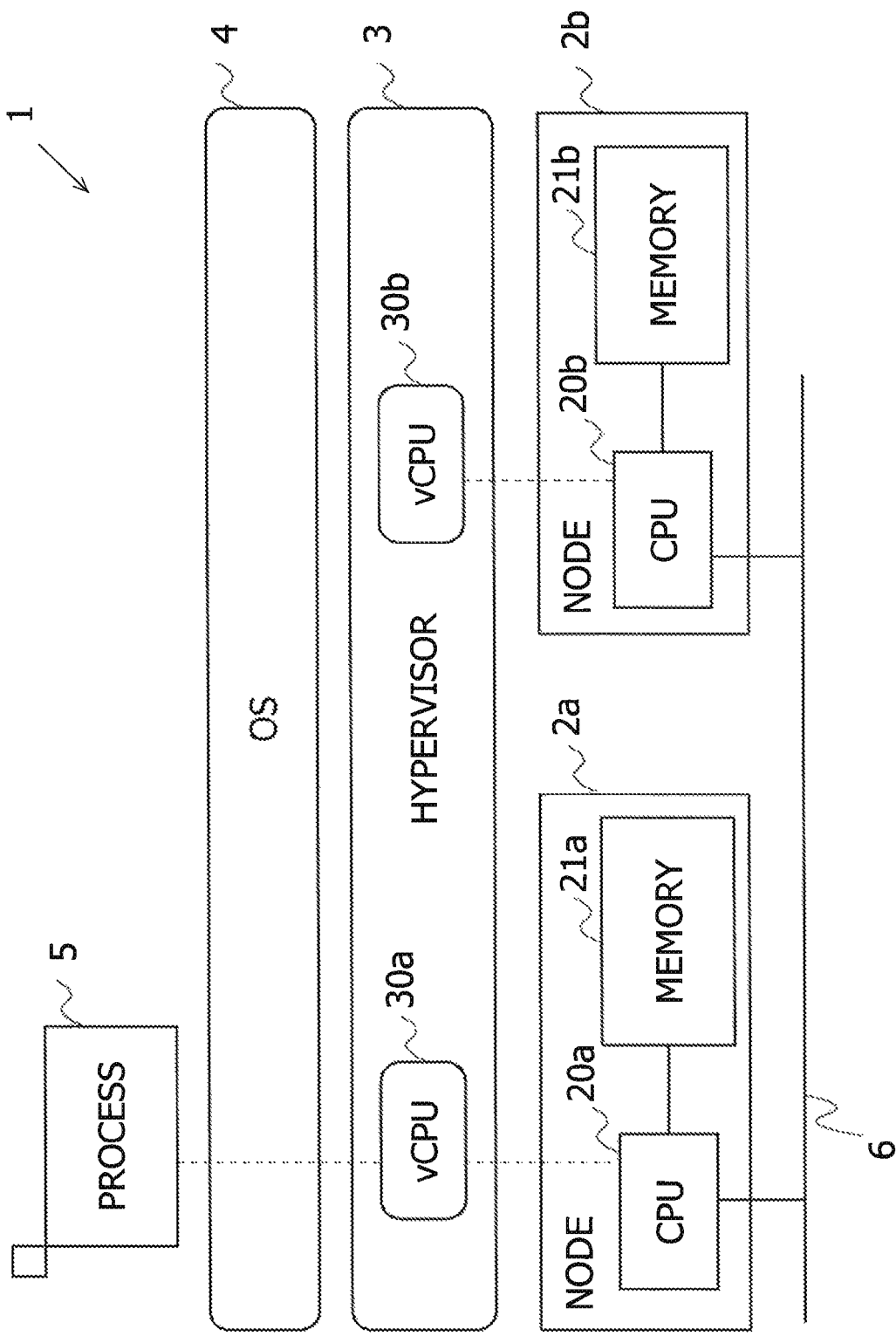
FIG. 2 is a diagram illustrating architecture of an information processing system.

FIG. 2 is a diagram illustrating architecture of an information processing system 1. In FIG. 2, the information processing system 1 includes a node 2a, a node 2b, a hypervisor 3, an OS 4 and an interconnect 6. Further, a status of an active program running on the OS 4 is illustrated as a Process 5 in FIG. 2.

The node 2a and the node 2b are interconnected within the information processing system 1. Note that a number of the nodes interconnected within the information processing system 1 may be set larger than "2". The nodes interconnected within the information processing system 1 will, if generically termed, be simply referred to as the nodes 2. The node 2a has a CPU 20a and a memory 21a. Similarly, the node 2b has a CPU 20b and a memory 21b. The CPU 20a and the CPU 20b will, if generically termed, be simply referred to as the CPUs 20. The memory 21a and the memory 21b will, if generically termed, be simply referred to as the memories 21. Namely, each of the nodes 2 interconnected within the information processing system 1 has the CPU 20 and the memory 21, thereby executing various arithmetic processes. The node 2 is one example of an information processing apparatus.

The hypervisor 3 is a program for virtualizing a plurality of nodes 2 into one information processing apparatus. In FIG. 2, the hypervisor 3 includes virtual CPUs, i.e., a vCPU 30a and a vCPU 30b. The vCPU 30a and the vCPU 30b will, if generically termed, be simply referred to as the vCPUs 30. In the embodiment, the hypervisor 3 includes a same number of vCPUs 30 as the number of nodes interconnected within the information processing system 1. Each of the vCPUs 30 has a one-to-one correspondence with the CPU 20 of each of the nodes 2. A program allocated to each of the vCPUs 30 is actually allocated to and executed by the corresponding CPU 20.

The OS 4 is a program for managing or utilizing the information processing apparatus virtualized by the hypervisor 3. In FIG. 2, the Process 5 is allocated to the vCPU 30a via the OS 4 and the hypervisor 3 and is actually executed by the CPU 20a.

Note that the hypervisor 3 and the OS 4 may be included in one representative node 2, e.g., the node 2a within the information processing system 1. Further, the present technology can be also applied to a case of the plurality of nodes 2 not being virtualized by the hypervisor 3, each node 2 operating based on an individual OS and the respective CPUs 20 performing communications with each other. In this case, it may be sufficient that each CPU 20 detects the communication and decreases a CPU clock frequency during the communication.

The interconnect 6 is a network for connecting the plurality of nodes 2. The respective CPUs 20 possessed by the nodes 2 perform the communications via the interconnect 6.

<Occurrence of Exception Due to Page Fault>

Figure 3:
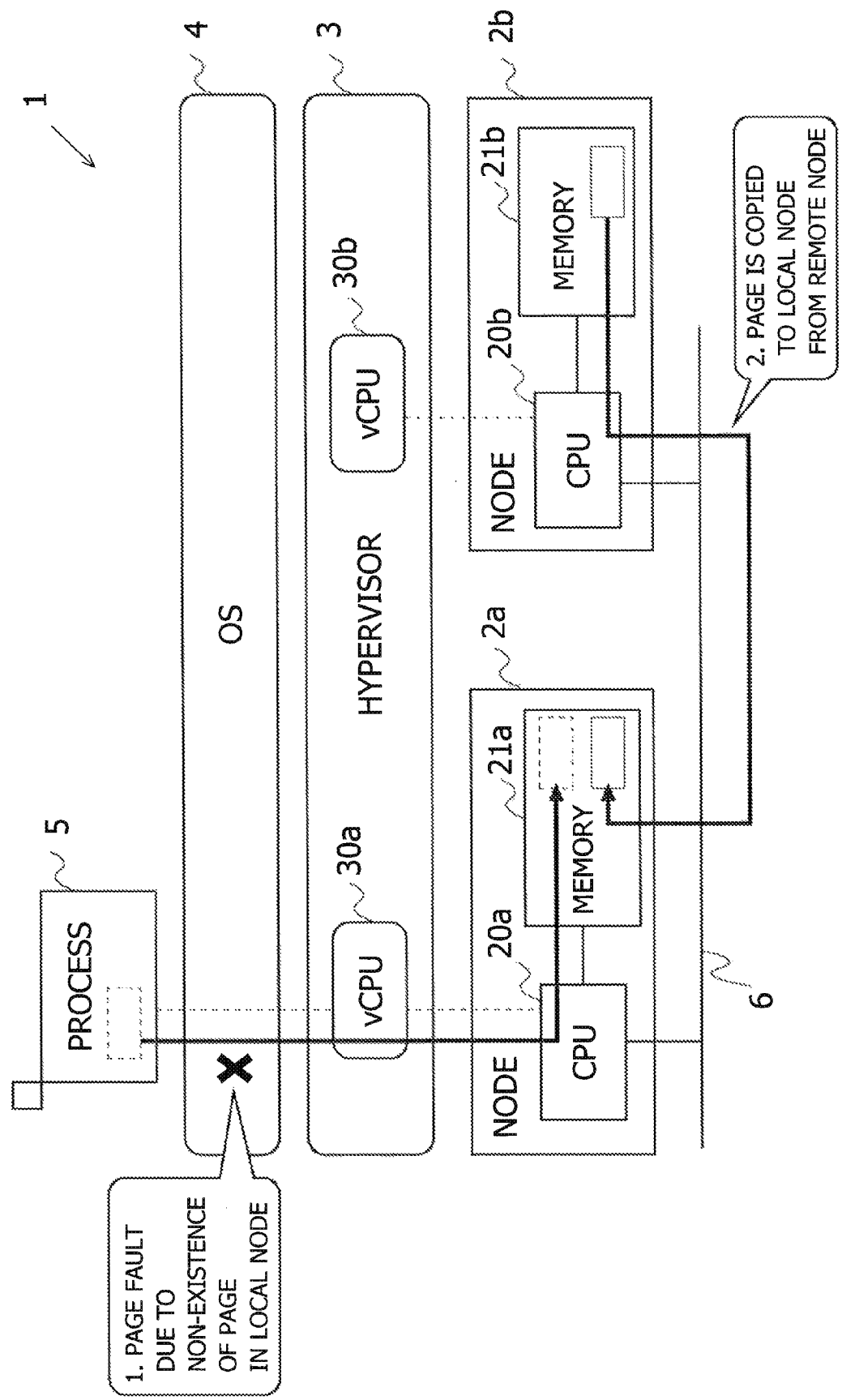
FIG. 3 is a diagram illustrating how an exception occurs due to a page fault.

FIG. 3 is a diagram illustrating how an exception occurs due to a page fault. In FIG. 3, the Process 5 is allocated to the vCPU 30a. The Process 5 accesses the node 2a and the node 2b via the vCPU 30a. The vCPU 30a corresponds to the CPU 20a, and therefore, as viewed from the Process 5, the node 2a is a local node, while the node 2b is a remote node.

The Process 5, while being executed, acquires a page of the memory 21a of the node 2a via the vCPU 30a. If the page to be acquired is not allocated to the memory 21a of the local node, the page fault occurs. Upon the occurrence of the page fault, the CPU 20a acquires data associated with this page from, e.g., the memory 21b of the node 2b.

Note that the page fault includes a case where the page to be acquired is not allocated to the memory 21a, however, the data associated with this page exist in an auxiliary storage device of the node 2a. Moreover, the page fault also includes a case in which the page to be acquired is allocated to the memory 21a, however, the data associated with this page are saved in the auxiliary storage device.

[First Working Example]

In a first working example (Example 1), when the exception occurs due to the page fault, the information processing apparatus focuses on the communication with another information processing apparatus and reduces power consumption by decreasing the CPU clock frequency for a period till acquiring the data since the occurrence of the page fault. The node 2a, each time the page fault occurs, conducts control such as setting low the CPU clock frequency while executing a communication process and resetting the CPU clock frequency back to an original frequency when the communication process completes. This method is called an "Each-Time method". The power consumption is reduced by decreasing the CPU clock frequency in the Example 1 and may also be reduced by decreasing a voltage of an arithmetic processing device. It will hereinafter be assumed that the process of varying the CPU clock frequency may be replaced by a process of varying the voltage.

<Block Configuration of Each-Time Method>

Figure 4:
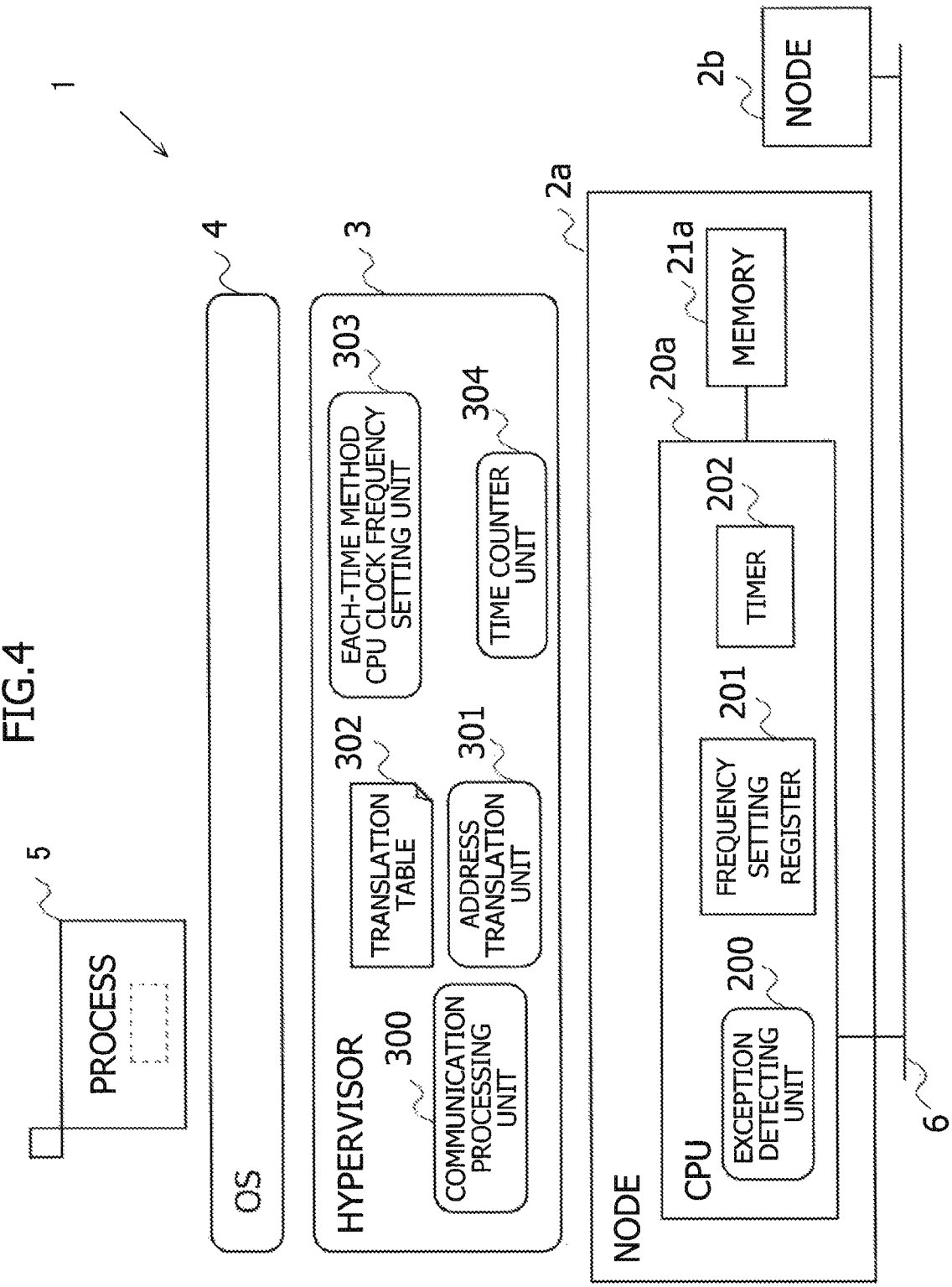
FIG. 4 is a diagram illustrating a block configuration in an Each-Time method.

FIG. 4 is a diagram of a block configuration of the Each-Time method. The block configuration of the Each-Time method will be described by use of FIG. 4. In FIG. 4, the Process 5 is executed in the node 2a under an environment configured by the hypervisor 3 and the OS 4. Further, the node 2a is connected via the interconnect 6 to the node 2b. The CPU 20a includes an exception detecting unit 200, a frequency setting register 201 and a timer 202. The hypervisor 3 includes a communication processing unit 300, an address translation unit 301, a translation table 302, an Each-Time method CPU clock frequency setting unit 303 and a time counter unit 304. The node 2a is one example of the information processing apparatus. Furthermore, the node 2b is one example of another information processing apparatus. The CPU 20a executes a computer program deployed in an executable manner on the memory 21a, thereby functioning as the communication processing unit 300, the address translation unit 301, the Each-Time method CPU clock frequency setting unit 303 and the time counter unit 304, which are given in the hypervisor 3. Note that any one of the communication processing unit 300, the address translation unit 301, the Each-Time method CPU clock frequency setting unit 303 and the time counter unit 304 or apart of processes thereof may also be executed by hardware circuits.

The exception detecting unit 200 detects that the exception occurs due to the page fault in the Process 5. The exception detecting unit 200 hands over, as the process of the CPU 20a, the control to the hypervisor 3 in, e.g., an exception process program to handle the page fault. The frequency setting register 201 stores the CPU clock frequency of the CPU 20a. The CPU clock frequency of the CPU 20a is varied to a frequency set in the frequency setting register 201. The timer 202 provides a time counter function to the hypervisor 3, the OS 4, etc.

When the page fault occurs and a physical address of the memory 21 of another node 2 holding the page to be acquired by the Process 5 is specified, the communication processing unit 300 starts a process to transfer the data of the page to the memory 21a serving as a local memory.

The address translation unit 301, upon the occurrence of the page fault, refers to the translation table 302 and thus specifies a physical address of the page on the memory 21 of the node 2 holding the page from a virtual address of the page to be acquired by the Process 5.

The translation table 302 associates a virtual address of the page to be acquired by the Process 5 with the node 2 possessing the page and a physical address of this node 2 on the memory 21. FIG. 5 is a diagram illustrating a data structure of the translation table 302. The translation table 302 has a "virtual address" field, a "page possessing node" field and a "physical address" field. The "virtual address" field is a field indicating the virtual address of the page in the vCPU 30 of the hypervisor 3. The "page possessing node" field is a field indicating the node 2 possessing the page allocated to the "virtual address" field. The "physical address" field is a field indicating the physical address of the page allocated to the "virtual address" field in the node 2.

The Each-Time method CPU clock frequency setting unit 303 sets low the CPU clock frequency when the page fault occurs and, e.g., the page transfer process starts. Further, the Each-Time method CPU clock frequency setting unit 303, after a predetermined period of time elapses, resets the CPU clock frequency back to the original frequency. The Each- Time method CPU clock frequency setting unit 303 varies the CPU clock frequency by setting the CPU clock frequency in the frequency setting register 201. The Each-Time method CPU clock frequency setting unit 303 is one example of a control unit.

The time counter unit 304 counts beforehand a period of page transfer time. Further, the time counter unit 304 counts a period of time since a start of the communication for transferring the page by referring to the timer 202, and notifies the Each-Time method CPU clock frequency setting unit 303 of timing when resetting the CPU clock frequency back to the original frequency after an elapse of the predetermined time. Herein, the predetermined time is a period of time originally expended for transferring the page. Generally, however, transition time of approximately 10 μsec is expended till the CPU clock frequency of the processor used as the CPU 20 is reset back to the original CPU clock frequency from a state of the frequency being set low. This transition time is called DVFS (Dynamic Voltage and Frequency Scaling) transition time. Accordingly, in order to attain the state of being reset back to the original CPU clock frequency upon completing the page transfer, the predetermined time described above is set to a period of time given by subtracting the DVFS transition time from the page transfer time. Note that the DVFS transition time differs on a processor-by-processor basis, and hence the time for the DVFS transition is set for every usage environment. FIG. 7 is a diagram illustrating an example of a period of time for DVFS transition per processor. For example, an Intel Xeon X5570 processor expends the DVFS transition time of 10 μsec, and an AMD FX-8150 processor expends the DVFS transition time of 8 μsec (refer to Non-Patent document 5). The time counter unit 304 calculates the predetermined time by subtracting the DVFS transition time set for every usage environment.

<Variation in CPU Clock Frequency in Each-Time Method>

Figure 6:
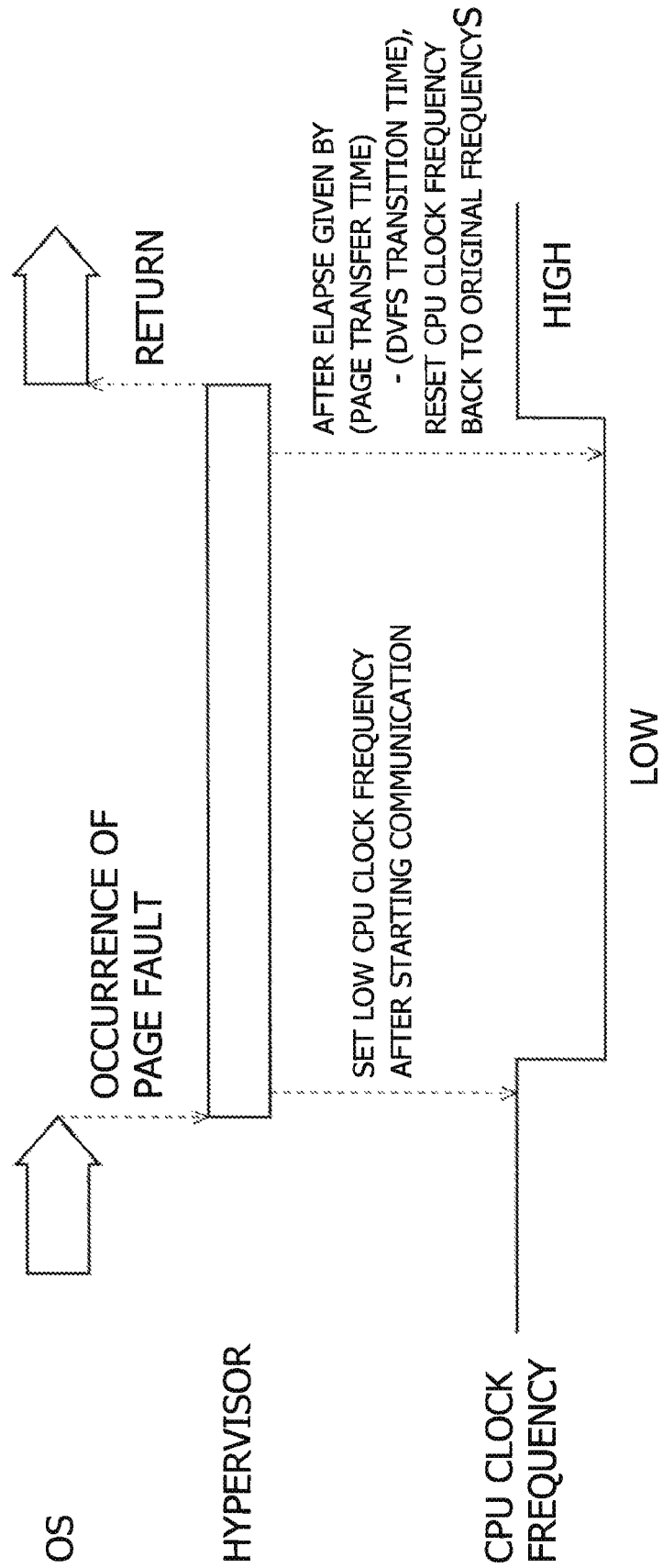
FIG. 6 is a diagram illustrating an example of a variation in CPU clock frequency in a procedure of Example 1.

FIG. 6 is a diagram illustrating an example of a variation in CPU clock frequency in a procedure of Example 1. A description about the variation in CPU clock frequency till the control is returned to the OS since the occurrence of the page fault in the Each-Time method, will be made by using FIG. 6. Upon the occurrence of the page fault, for instance, when starting the communication for transferring the page, the Each-Time method CPU clock frequency setting unit 303 of the hypervisor 3 sets low the CPU clock frequency. Herein, a desirable point of time when starting the communication for the page transfer is precisely a point of time when starting the actual page transfer. This is because such accuracy rises that the point of time when the CPU clock frequency is set low coincides with a point of time when reaching busy waiting. It does not, however, mean that the point of time when starting the communication for the page transfer is limited to the point of time when starting the actual page transfer. Namely, when permitted is a deviation in terms of allowable limit between the point of time when the CPU clock frequency is set low and the point of time when reaching the busy waiting, for example, the point of time when the page fault occurs may be deemed to be the point of time when starting the communication for the page transfer. Further, after the occurrence of the page fault, the point of time when the communication processing unit 300 starts a process of transferring the data of the page may be deemed to be the point of time when starting the communication for the page transfer.

Furthermore, when finishing the communication for the page transfer or when a period of time given by (Page Transfer Time)—(DVFS Transition Time) elapses since the point of time when starting the communication, the Each-Time method CPU clock frequency setting unit 303 resets the CPU clock frequency back to the original CPU clock frequency. Note that a desirable point of time when starting the communication, which serves as an originating point for determining the elapse of the time given by (Page Transfer Time)—(DVFS Transition Time), is precisely the point of time when starting the actual page transfer. This is because such accuracy rises that the point of time when the CPU clock frequency is reset back to the original frequency coincides with the point of time when the CPU 20 returns from the busy waiting upon finishing the page transfer. It does not, however, mean that the point of time when starting the communication is limited to the point of time when starting the actual page transfer. Namely, when permitted is a deviation in terms of allowable limit between the point of time when the CPU clock frequency is reset back to the original frequency and the point of time when the CPU 20 returns from the busy waiting upon finishing the page transfer, for instance, the point of time when the page fault occurs or the point of time when the communication processing unit 300 starts the process of transferring the data of the page after the occurrence of the page fault, may also be set as the point of time when starting the communication.

<Processing Flow of Each-Time Method>

A processing flow of the Each-Time method will be described by using FIGS. 8 through 10. In the Each-Time method, the time counter unit 304 previously counts the page transfer time. Upon the occurrence of the page fault, the hypervisor 3 sets low the CPU clock frequency during a period given by subtracting the DVFS transition time from the page transfer time.

Figure 8:
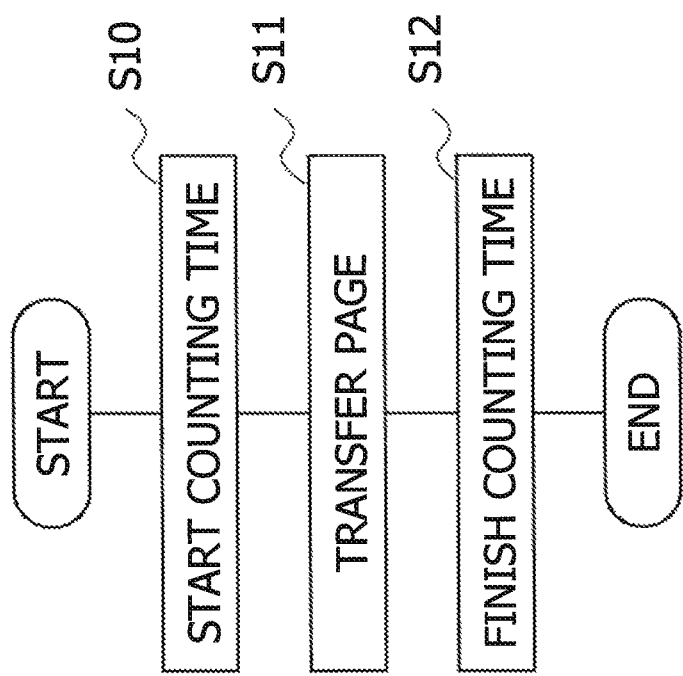
FIG. 8 is a flowchart illustrating a procedure of a count process of page transfer time in Example 1.

FIG. 8 is a flowchart illustrating a procedure of a count process of the page transfer time in the Example 1. It does not mean that there is a limit to timing for executing the count process of the page transfer time. For example, the count process of the page transfer time may be executed when a first page fault occurs. In step S10, the time counter unit 304 starts counting the time upon the start of the communication for the page transfer. In step S11, the CPU 20a transfers the data of the page having a predetermined size to the memory 21a of the self-node 2a from the memory 21b of another node 2b. The "predetermined size" is a page size defined as a unit for the management on the memory 21. In step S12, the time counter unit 304 finishes counting the time upon completing the communication for the page transfer. When completing the process in step S12, the time counter unit 304 terminates the count process of the page transfer time.

Figure 9:
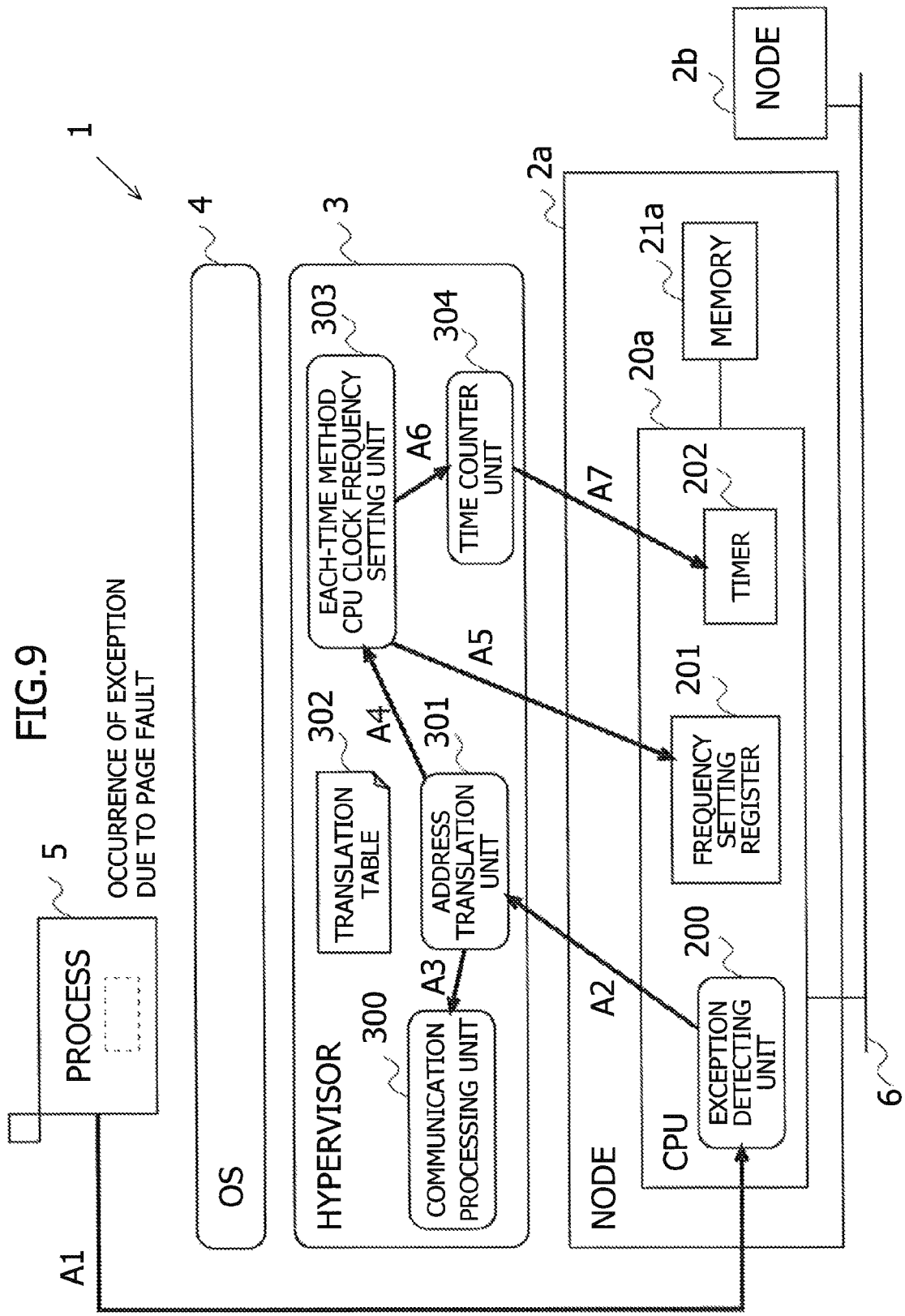
FIG. 9 is a diagram illustrating an outline of a processing flow of the information processing system when the page fault occurs in the Each-Time method.

FIG. 9 is a diagram illustrating an outline of the processing flow of the information processing system when the page fault occurs in the Each-Time method. When the exception occurs due to the page fault, the exception detecting unit 200 detects the exception (A1). Upon the detection of the exception, the control is handed over to the hypervisor 3 (A2). The address translation unit 301 obtains, from the virtual address of the page causing the page fault by referring to the translation table 302, the node possessing this page and the physical address of this page. The communication processing unit 300 receives the page possessing node and the physical address from the address translation unit 301, and starts the transfer process (A3). The address translation unit 301 notifies the Each-Time method CPU clock frequency setting unit 303 that the communication processing unit 300 starts the transfer process (A4). The Each-Time method CPU clock frequency setting unit 303 sets the CPU clock frequency having a low value in the frequency setting register 201 (A5). The time counter unit 304, upon the start of the communication, starts counting the time (A6). The time counter unit 304 refers to the timer 202 and, when the predetermined time elapses, notifies the Each-Time method CPU clock frequency setting unit 303 of the timing for resetting the CPU clock frequency back to the original frequency (A7).

Figure 10:
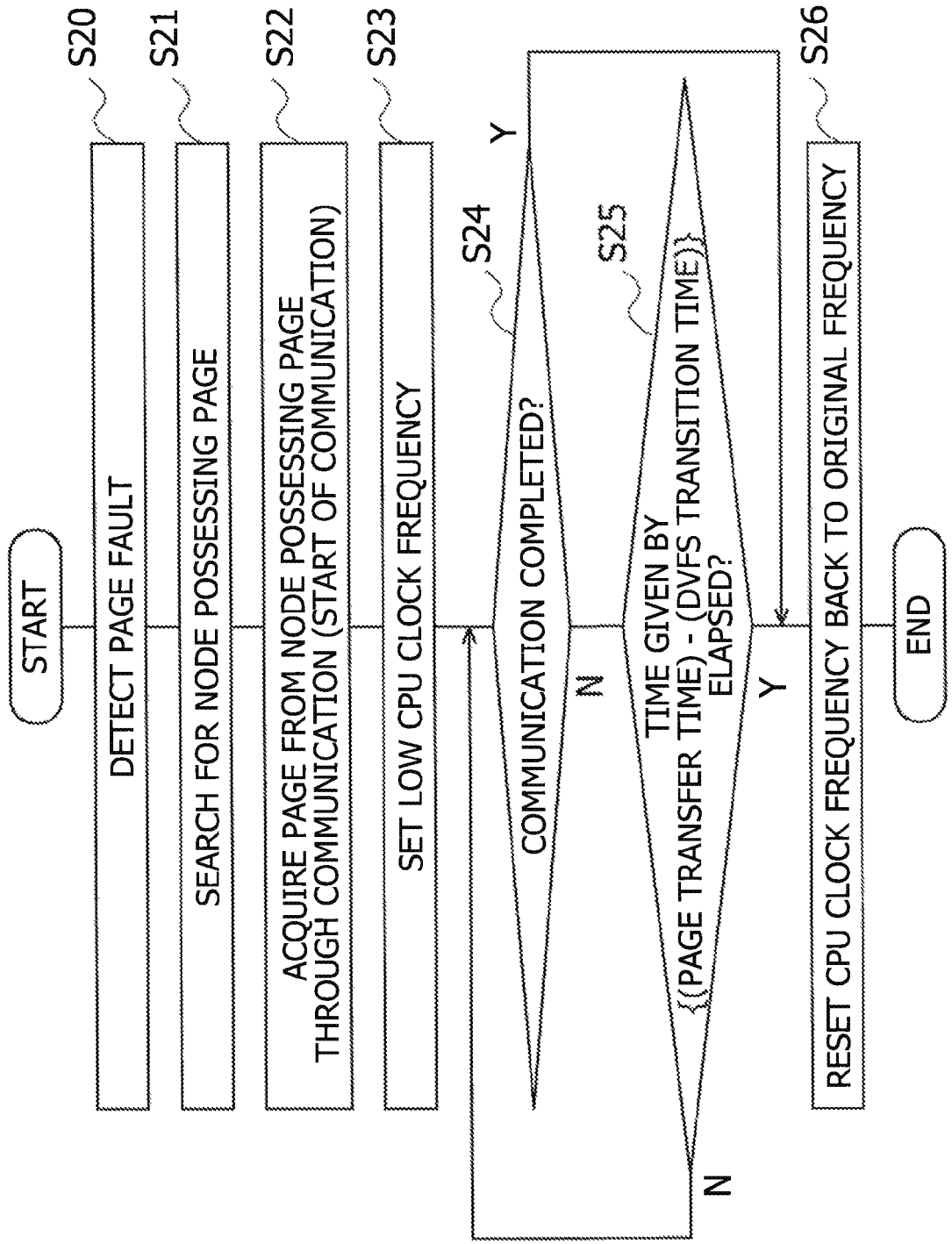
FIG. 10 is a flowchart illustrating a procedure of a CPU clock frequency setting process in Example 1.

FIG. 10 is a flowchart illustrating a procedure of a CPU clock frequency setting process in the Example 1. A start of the CPU clock frequency setting process is triggered by the occurrence of the page fault. In step S20, the exception detecting unit 200 detects the exception due to the page fault. The exception detecting unit 200 executes a process in step S20 by way of one example of detecting an exception event of a self main memory when the arithmetic processing device requests an access to data on the main memory possessed by the another information processing apparatus.

In step S21, the address translation unit 301 searches for the node 2 possessing the relevant page from the virtual address of the page to be accessed by the Process 5 by referring to the translation table 302. In step S22, the communication processing unit 300 starts the transfer process, thereby starting the communication. The CPU 20a acquires the relevant page from the memory of the node 2, e.g., the node 2b being searched for in step S21.

In step S23, the hypervisor 3 sets low the CPU clock frequency. To be specific, the Each-Time method CPU clock frequency setting unit 303 sets the CPU clock frequency having the low value in the frequency setting register 201. The hypervisor 3 executes a process in step S23 byway of one example of varying the clock frequency of the arithmetic processing device on the basis of the detection of the exception event.

In step S24, the hypervisor 3 determines whether the communication for the page transfer is completed or not. When the communication is completed, the hypervisor 3 advances to a process in step S26. Whereas when not completing the communication, the hypervisor 3 advances to a process in step S25.

In step S25, the hypervisor 3 determines whether a period of time obtained by subtracting the DVFS transition time from the page transfer time elapses or not. When the relevant time does not elapse, the hypervisor 3 loops back to the process in step S24. Whereas when the relevant time elapses, the hypervisor 3 advances to a process in step S26.

In step S26, the Each-Time method CPU clock frequency setting unit 303 resets the CPU clock frequency back to the original frequency, i.e., to the value before starting the communication. Specifically, the Each-Time method CPU clock frequency setting unit 303 sets the value of the CPU clock frequency before starting the communication in the frequency setting register 201. The hypervisor 3 executes a process in step S26 by way of one example of varying the clock frequency of the arithmetic processing device on the basis of the detection of the exception event. When completing the process in step S26, the hypervisor 3 terminates the CPU clock frequency setting process.

The Each-Time method described in the Example 1 involves performing, each time every single page fault occurs, the control to set low the CPU clock frequency while executing the communication process and to reset the CPU clock frequency back to the original frequency upon the completion of the communication process. The Each-Time method is effective in such a case that the page transfer time is sufficiently long for the DVFS transition time. Namely, the CPU clock frequency is set low during the period given by subtracting the DVFS transition time from the page transfer time, thereby making it possible to work to save electric power of the CPU 20 in away that restrains a decrease in performance. To be specific, the exception detecting unit 200 in the node 2a described in the Example 1 detects the exception exemplified by the page fault, and the Each-Time method CPU clock frequency setting unit 303 can adjust the frequency to a value enabling the electric power to be saved while restraining the decrease in performance on the basis of the detected exception. Further, in processes of FIG. 10, the Each-Time method CPU clock frequency setting unit 303 sets the CPU clock frequency of the CPU 20a to the frequency before being varied when the Each-Time method CPU clock frequency setting unit 303 completes acquiring the data (Y in S24) or when a period given by subtracting transition time for resetting the CPU clock frequency of the CPU 20a from the time taken for acquiring the data elapses since when starting the acquisition of the data (Y in S25). Accordingly, the node 2a can, through the processes in FIG. 10, enhance the accuracy of the coincidence between the point of time when the CPU clock frequency is set low and the point of time when reaching the busy waiting.

[Second Working Example]

In a second working example (Example 2), the node 2a integrates periods of communication time for the page fault process during predetermined unit time, and calculates a CPU usage rate in a way that deems the CPU not to operate while executing the communication process. The node 2a controls the CPU clock frequency in accordance with the calculated CPU usage rate. This method is called a Scheduler method. In the Example 2, the power consumption is reduced by controlling the CPU clock frequency and may also be reduced by controlling a voltage of the arithmetic processing device. It will hereinafter be assumed that a process of controlling the CPU clock frequency may be replaced by a process of controlling the voltage.

<Block Configuration of Scheduler Method>

Figure 11:
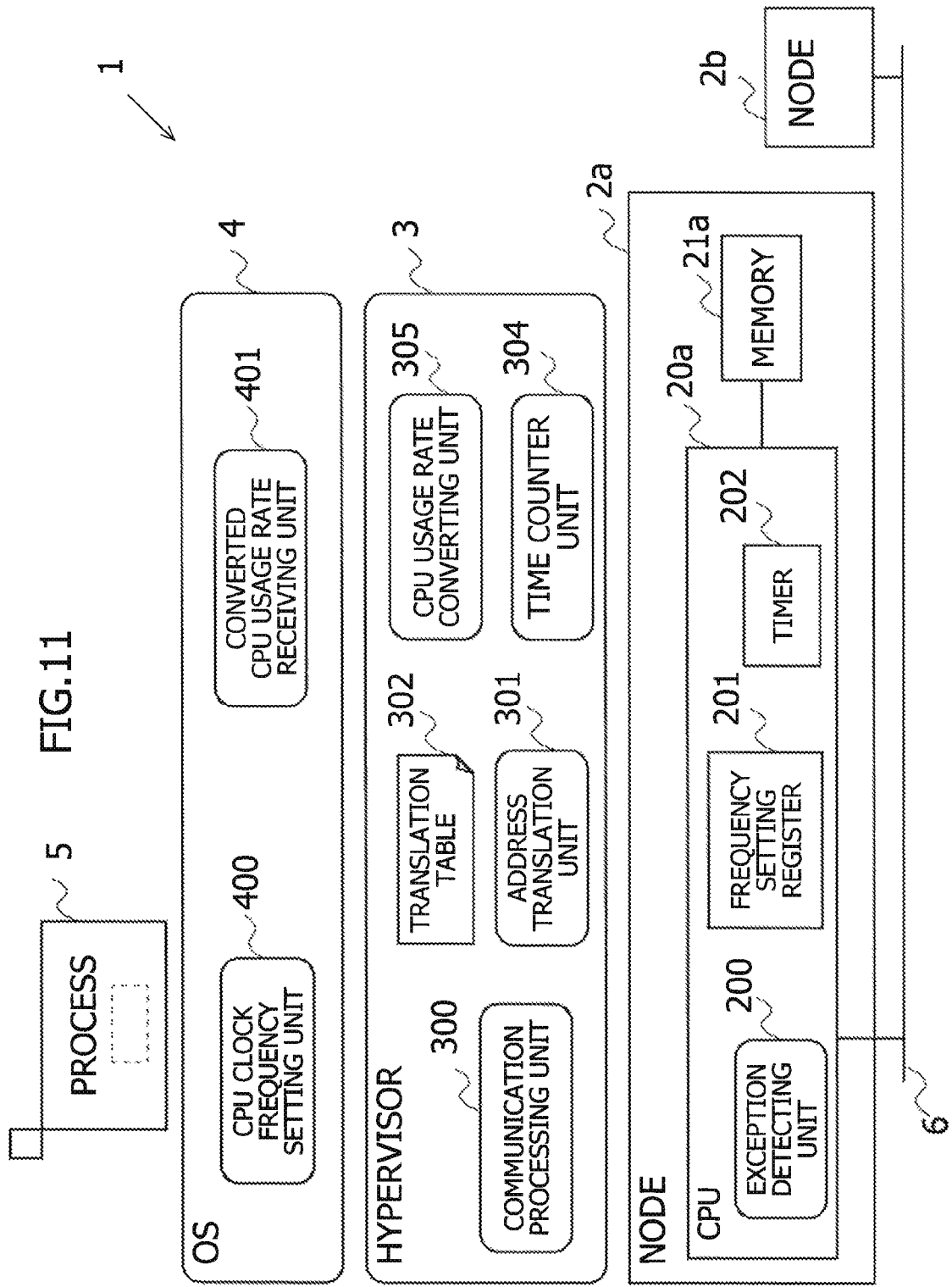
FIG. 11 is a diagram of a block configuration in a Scheduler method.

FIG. 11 is a diagram of a block configuration of the Scheduler method. The block configuration of the Scheduler method will be described by using FIG. 11. Explanations of the same components as those of the Each-Time method are omitted. The hypervisor 3 includes a CPU usage rate converting unit 305 in place of the Each-Time method CPU clock frequency setting unit 303 in the Example 1. The OS 4 includes a CPU clock frequency setting unit 400 and a converted CPU usage rate receiving unit 401. The CPU 20a executes a computer program deployed in the executable manner on the memory 21a, thereby functioning as the CPU clock frequency setting unit 400 and the converted CPU usage rate receiving unit 401. Note that any one of the CPU clock frequency setting unit 400 and the converted CPU usage rate receiving unit 401 or a part of processes thereof may also be executed by hardware circuits.

The CPU usage rate converting unit 305 calculates, as a CPU usage rate, a rate of how much a period of time given by subtracting both of the communication time for the page fault process and idle time for waiting other operation instruction and data from the predetermined unit time, occupies this predetermined unit time. This CPU usage rate is called a converted CPU usage rate. Note that the communication time for the page fault process is counted by the time counter unit 304. Specifically, the time counter unit 304, when page fault occurs for the predetermined unit time, counts a period of time till the completion of the communication since the start of the communication for the page transfer, and calculates the communication time for the page fault process by integrating the counted periods of time.

The CPU clock frequency setting unit 400, if the converted CPU usage rate is smaller than a threshold value being uniquely determined by the OS 4 for one unit time, sets low the CPU clock frequency for the next unit time. Moreover, the CPU clock frequency setting unit 400, if the converted CPU usage rate is equal to or larger than the threshold value, sets high the CPU clock frequency for the next unit time. The OS 4 is equipped with a mechanism for adjusting the CPU clock frequency in accordance with the CPU usage rate, and the CPU clock frequency setting unit 400 sets the CPU clock frequency by utilizing this mechanism. The CPU clock frequency setting unit 400 is one example of a control unit.

The converted CPU usage rate receiving unit 401 receives the CPU usage rate calculated by the CPU usage rate converting unit 305, and notifies the CPU clock frequency setting unit 400 of this received CPU usage rate.

<Variation in CPU Clock Frequency in Scheduler Method>

Figure 12:
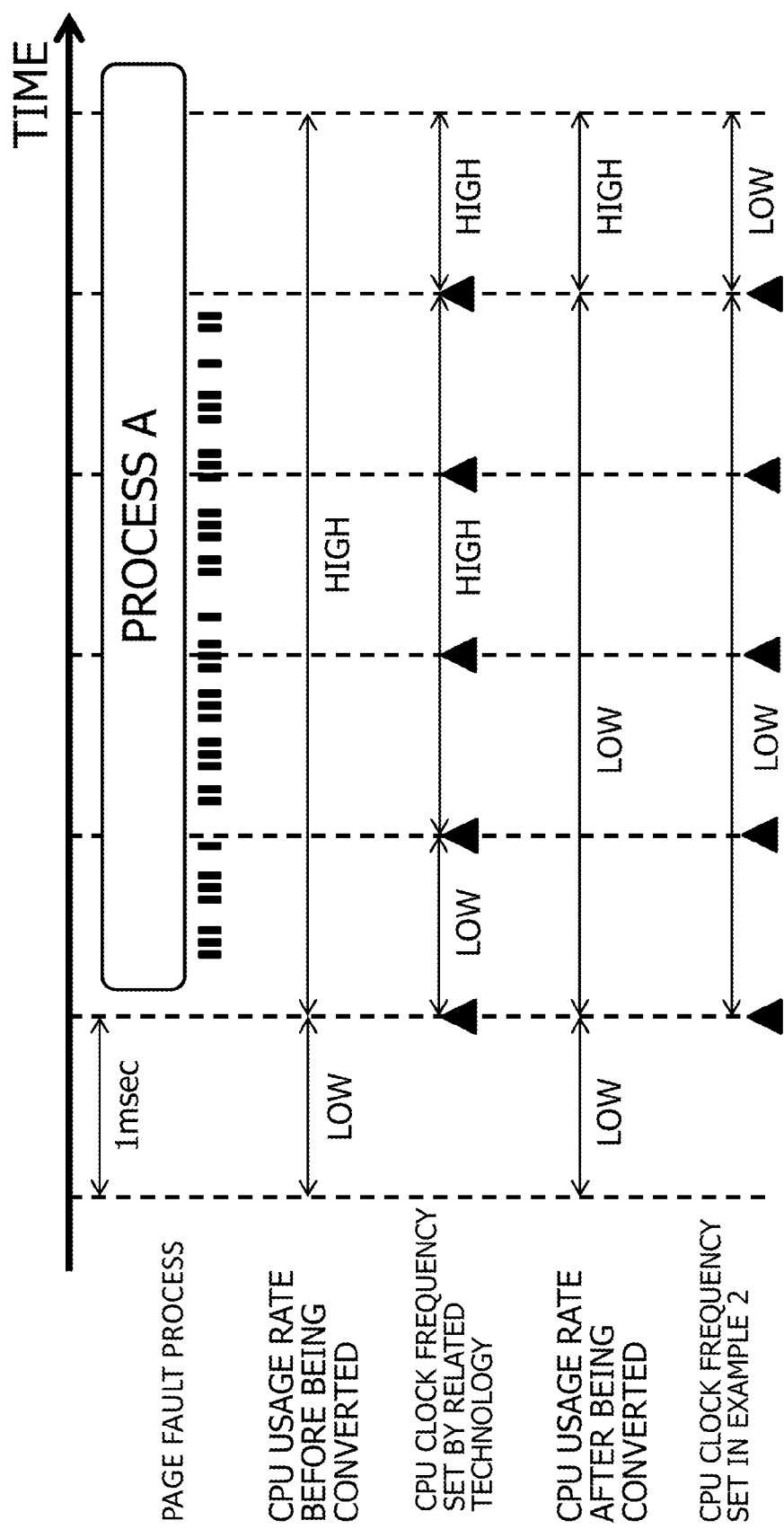
FIG. 12 is a diagram illustrating an example of the variation in CPU clock frequency in a procedure in Example 2.

FIG. 12 is a diagram illustrating an example of a variation in CPU clock frequency in a procedure according to the Example 2. A description of how the CPU clock frequency is controlled by the Scheduler method will be made by use of FIG. 12. In FIG. 12, the predetermined unit time is to be set to 1 msec. The OS 4 controls the CPU clock frequency per unit time of 1 msec in a process of Process A. A plurality of page faults occurs for each unit time. The time counter unit 304, when the page fault occurs for one unit time, counts the time till the completion of the communication since the start of the communication for the page transfer, and calculates total communication time for the page fault process by integrating the counted periods of time.

The Scheduler method according to the Example 2 takes account of the communication time for the page fault process and deems this communication time as the idle time. Therefore, the CPU usage rate decreases as compared with a case in which the usage time contains the communication time due to the page fault.

<Processing Flow of Scheduler Method>

A processing flow of the Scheduler method will be described by use of FIGS. 13 through 16. In the Scheduler method, the time counter unit 304 calculates the total communication time for the page fault process. The OS 4 controls the CPU clock frequency in accordance with the converted CPU usage rate.

Figure 13:
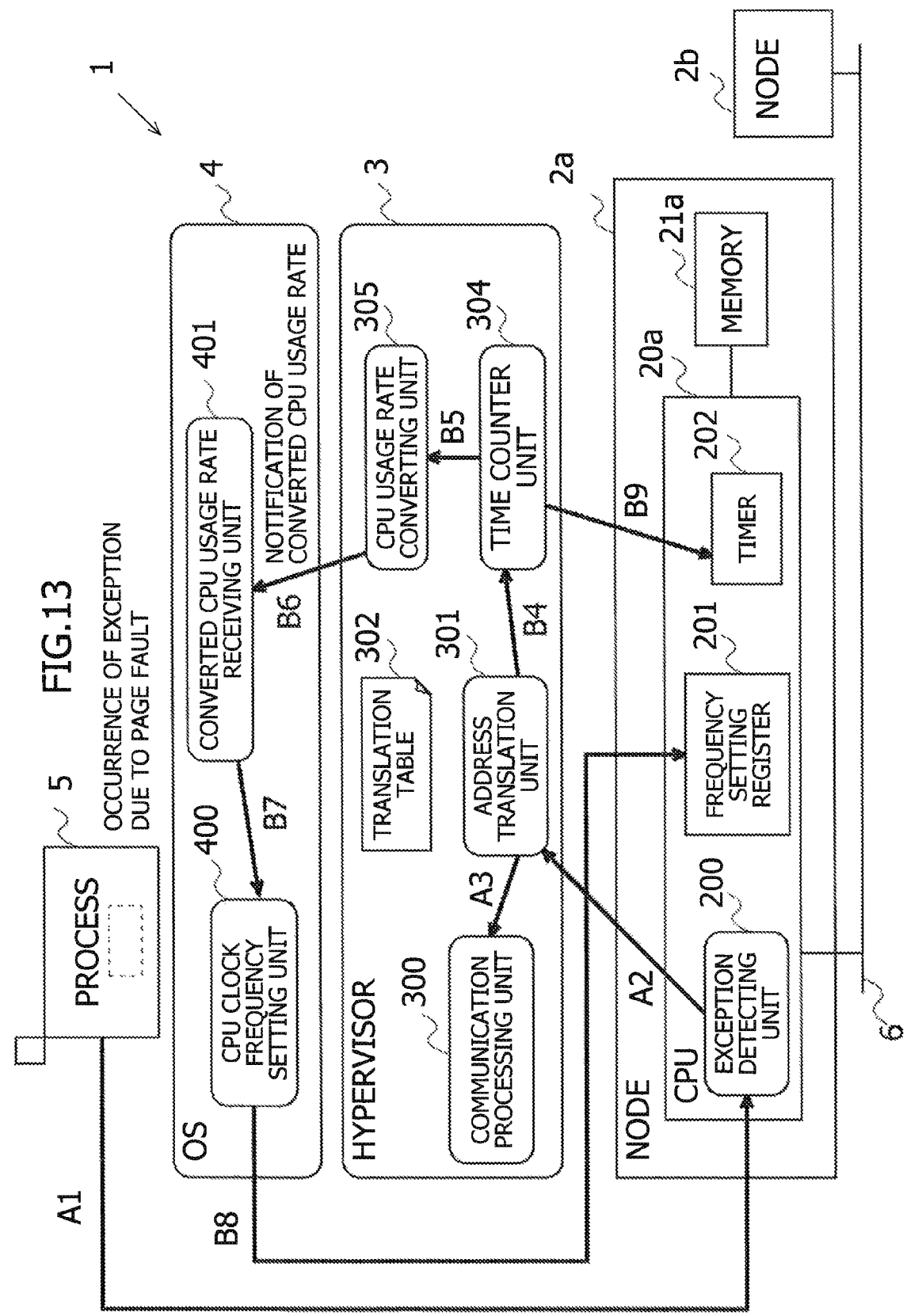
FIG. 13 is a diagram illustrating an outline of the processing flow of the information processing system during unit time in the Scheduler method.

FIG. 13 is a diagram illustrating an outline of a processing flow of the information processing system for the unit time in the Scheduler method. Processes (A1-A3) till the communication processing unit 300 starts the transfer process since the occurrence of the exception due to the page fault are the same as those in the case of the Each-Time method in FIG. 9. Namely, the address translation unit 301, based on the detection (A1) of the exception by the exception detecting unit 200, notifies the time counter unit 304 that the communication processing unit 300 starts the transfer process through the process by the hypervisor 3 (B4). The time counter unit 304 counts the time till the completion of the communication since the start of the communication for the page transfer, and calculates the total communication time for the page fault process by integrating the counted periods of time. The time counter unit 304 notifies the CPU usage rate converting unit 305 of the calculated total communication time (B5). The CPU usage rate converting unit 305 calculates the converted CPU usage rate and notifies the converted CPU usage rate receiving unit 401 of the thus-calculated converted CPU usage rate (B6). The converted CPU usage rate receiving unit 401 notifies the CPU clock frequency setting unit 400 of the converted CPU usage rate (B7). The CPU clock frequency setting unit 400 sets the CPU clock frequency corresponding to the converted CPU usage rate in the frequency setting register 201 (B8). The time counter unit 304 refers to the timer 202 and notifies the CPU usage rate converting unit 305 of timing for calculating the converted CPU usage rate upon an elapse of the unit time (B9).

Figure 14:
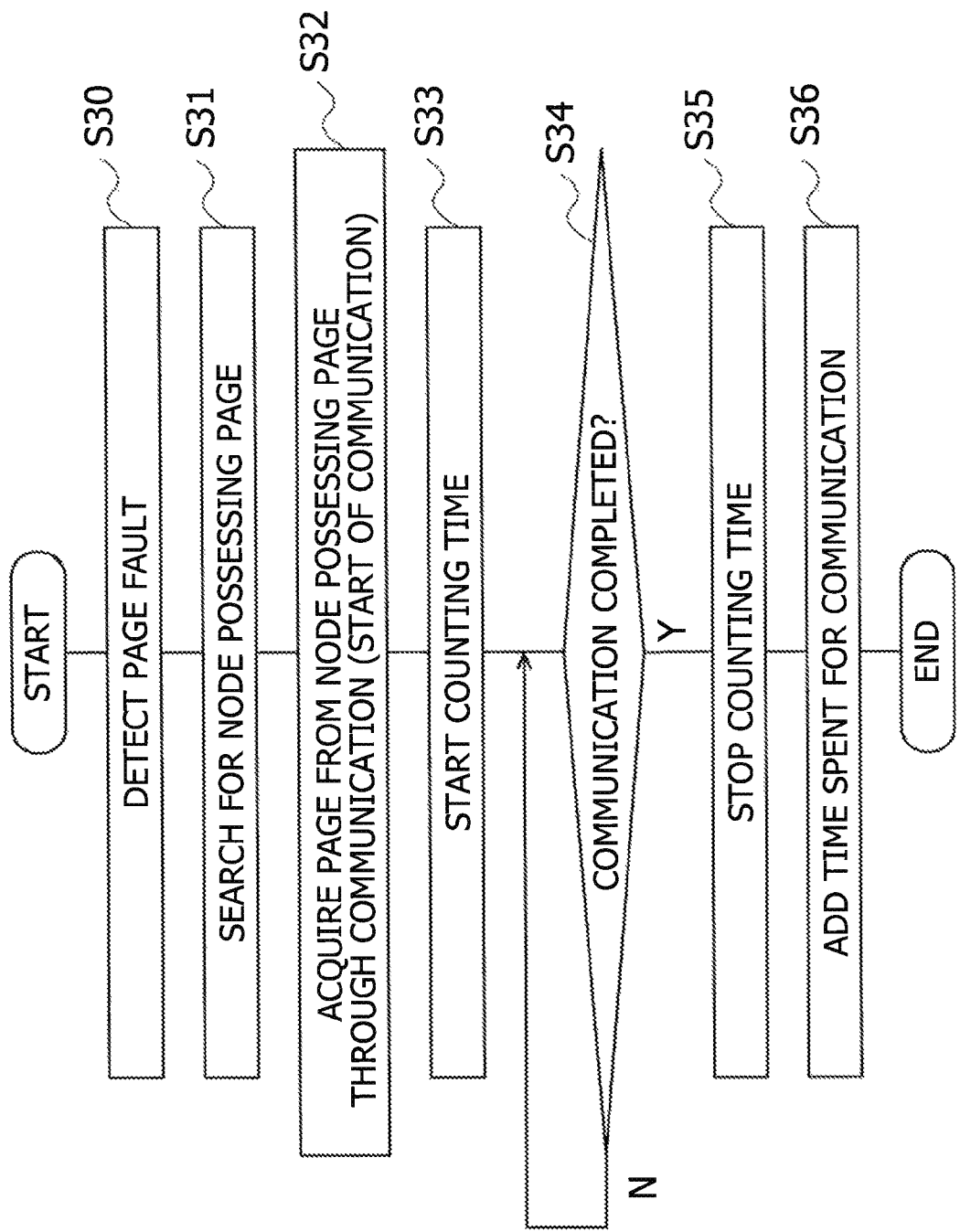
FIG. 14 is a flowchart illustrating a procedure of a count process of communication time for the page fault process in Example 2.

FIG. 14 is a flowchart illustrating a procedure of the count process of the communication time for the page fault process in the Example 2. The count process of the communication time for the page fault process is carried out each time the page fault occurs during a period since a start of the unit time till an end of the unit time. The total communication time for the unit time is calculated by integrating the periods of communication time for the respective page fault processes. A start of the count process of the communication time for the page fault process is triggered by the occurrence of the page fault.

Step S30 through step S32 are the same as step S20 through step S22 in the Each-Time method in FIG. 10. Note that the exception detecting unit 200 executes a process in step S30 by way of one example of detecting an exception event of a self main memory when the arithmetic processing device requests an access to data on the main memory possessed by the another information processing apparatus.

In step S33, the time counter unit 304 starts counting the time upon the start of the communication for the page transfer. In step S34, the time counter unit 304 determines whether the communication for the page transfer is completed or not. When the communication is completed, the time counter unit 304 advances to a process in step S35. Whereas when the communication is not completed, the time counter unit 304 executes again the process in step S34. In step S35, the time counter unit 304 stops counting the time when completing the communication for the page transfer. In step S36, the time counter unit 304 adds the time expended for the communication to the total of the communication time for the unit time. Upon the completion of the process in step S36, the hypervisor 3 terminates the count process of the communication time for the page fault process.

Figure 15:
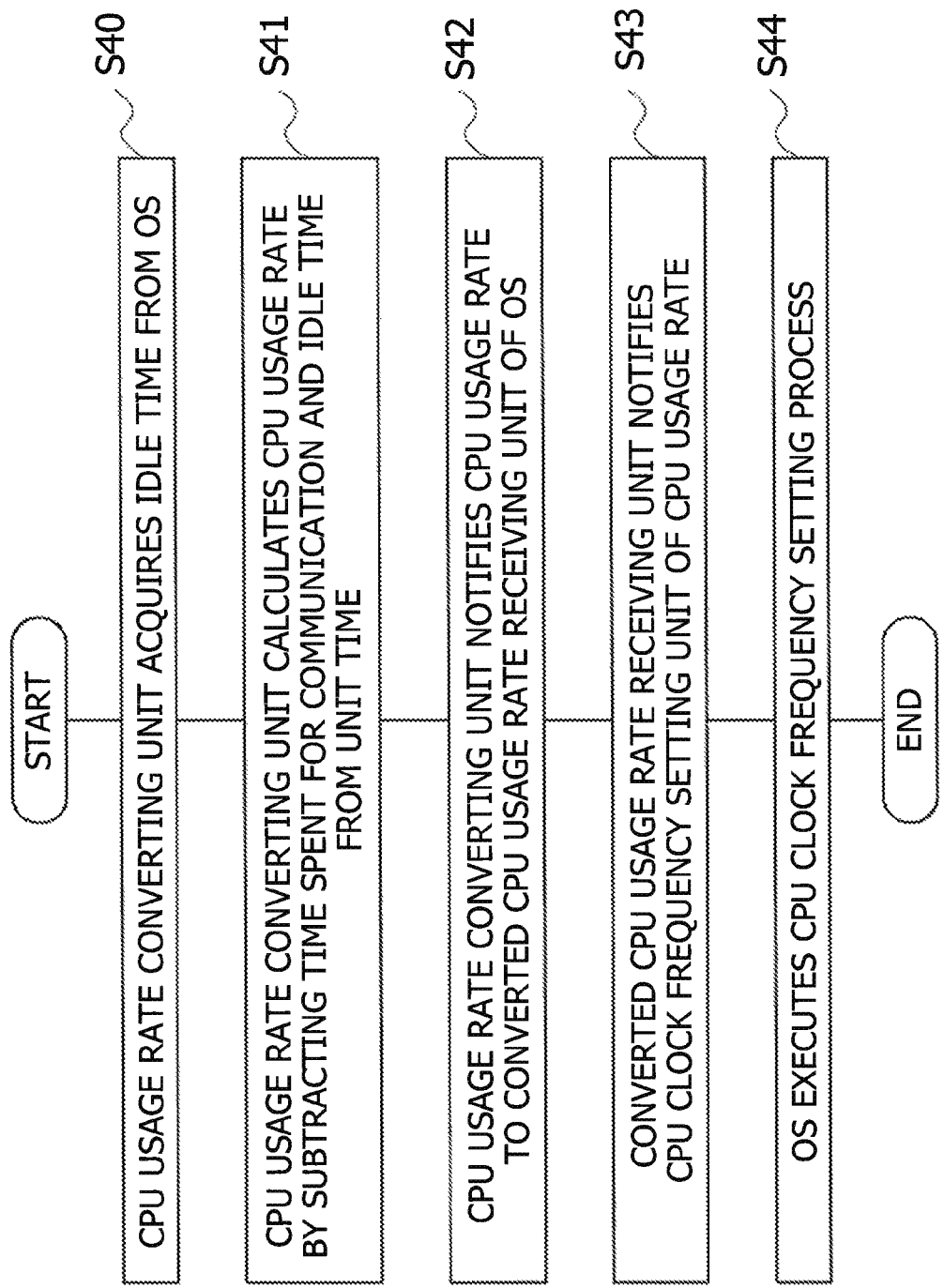
FIG. 15 is a flowchart illustrating a procedure of a CPU usage rate converting process in Example 2.

FIG. 15 is a flowchart illustrating a procedure of a CPU usage rate converting process in the Example 2. A start of the CPU usage rate converting process is triggered by the elapse of the unit time. In step S40, the CPU usage rate converting unit 305 acquires the idle time from the OS. In step S41, the CPU usage rate converting unit 305 calculates, as the CPU usage rate, a rate at which a period of time given by subtracting the total of the communication time for the page fault process and the idle time from the unit time, occupies this unit time.

In step S42, the CPU usage rate converting unit 305 notifies the thus-calculated converted CPU usage rate to the converted CPU usage rate receiving unit 401 of the OS 4. In step 543, the converted CPU usage rate receiving unit 401 notifies the CPU clock frequency setting unit 400 of the thus-notified converted CPU usage rate. In step S44, the OS 4 sets the thus-notified converted CPU usage rate in the frequency setting register 201, and executes the CPU clock frequency setting process. The OS 4 executes a process in step S44 by way of one example of varying the clock frequency of the arithmetic processing device on the basis of the detection of the exception event. Upon the completion of the process in step S44, the OS 4 terminates the CPU usage rate converting process.

Figure 16:
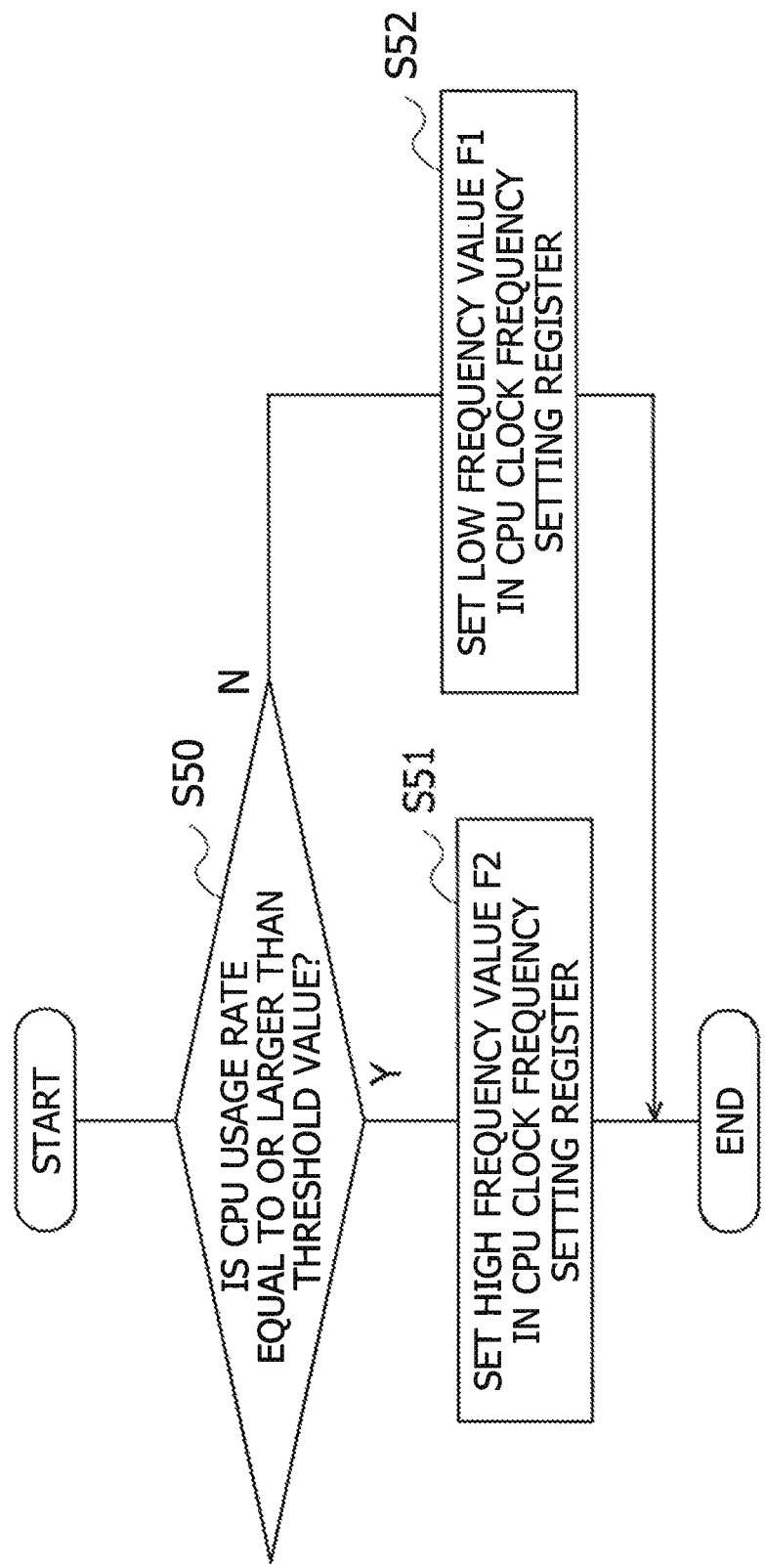
FIG. 16 is a flowchart illustrating a procedure of a CPU clock frequency setting process by OS in Example 2.

FIG. 16 is a flowchart illustrating a procedure of the CPU clock frequency setting process by the OS 4 in the Example 2. In FIG. 16, an operation frequency is contrived to use two frequencies F1, F2 (F1+ΔF=F2). Herein, ΔF represents a difference between the two frequencies. The frequency setting process by the OS 4 corresponds to step S44 in FIG. 15. In step S50, the OS 4 determines whether the CPU usage rate received by the converted CPU usage rate receiving unit 401 is equal to or larger than the threshold value or not. The OS 4, if the CPU usage rate is equal to or larger than the threshold value, advances to a process in step S51. Whereas if the CPU usage rate is smaller than the threshold value, the OS 4 advances to a process in step S52. In step S51, the OS 4 sets a value of the higher of the two frequencies, i.e., a value of the CPU clock frequency F2 in the CPU clock frequency setting register 201. In step S52, the OS 4 sets a value of the lower of the two frequencies, i.e., a value of the CPU clock frequency F1 in the CPU clock frequency setting register 201. When completing the process in step S51 or step S52, the OS 4 terminates the CPU clock frequency setting process.

The Scheduler method described in the Example 2 is configured to calculate the CPU usage rate while taking account of the communication time for the page fault process and to control the CPU clock frequency in accordance with the calculated CPU usage rate. The Scheduler method is effective in a case where the page transfer time is not so long as compared to the DVFS transition time. The Scheduler method is configured to integrate the periods of communication time for the page fault process for the predetermined unit time and to deem the CPU not to operate while executing the communication process, and hence the CPU usage rate is calculated low. If the CPU usage rate is smaller than the threshold value, the OS 4 sets low the CPU clock frequency for the next unit time. Accordingly, as compared to the case of not taking into consideration the communication time for the page fault process, the electric power of the CPU 20 can be saved while restraining the decrease in performance. Namely, the exception detecting unit 200 in the node 2a described in the Example 2 detects the exception exemplified by the page fault, and the CPU usage rate converting unit 305 and the OS 4 can adjust the frequency to a value enabling the electric power to be saved while restraining the decrease in performance on the basis of the detected exception. In the Example 2, as in FIG. 16, the OS 4 makes a 2-stage determination such as determining whether the CPU usage rate is equal to or larger than the threshold value R and whether the CPU usage rate is smaller than the threshold value R, thereby setting the CPU clock frequency. The Scheduler method is not, however, limited to the procedure in FIG. 16. For example, the CPU usage rate may also be determined by making a 3-stage determination such as whether the CPU usage rate is equal to or smaller than a threshold value R1, whether between the threshold value R1 and a threshold value R2 and whether equal to or larger than the threshold value R2, or making a 3- or more-stage determination using minutely set threshold values.

<Estimation of Effect of System>

A system effect was estimated by roughly calculating a power saving effect in the case of applying the embodiments to a distributed shared memory system. As a result of the estimation, the power of the CPU could be saved by approximately 50% in a larger effect case. For calculating the effect in the whole system, at first, the estimations were conducted about the following four items. The items about which the estimations were conducted are (a) a page update speed in a specific application, (b) a period of page transfer time per one time, (c) a period of average page access processing time on the distributed shared memory system, and (d) a power reduction effect by the DVFS.

Figures 17, 18:
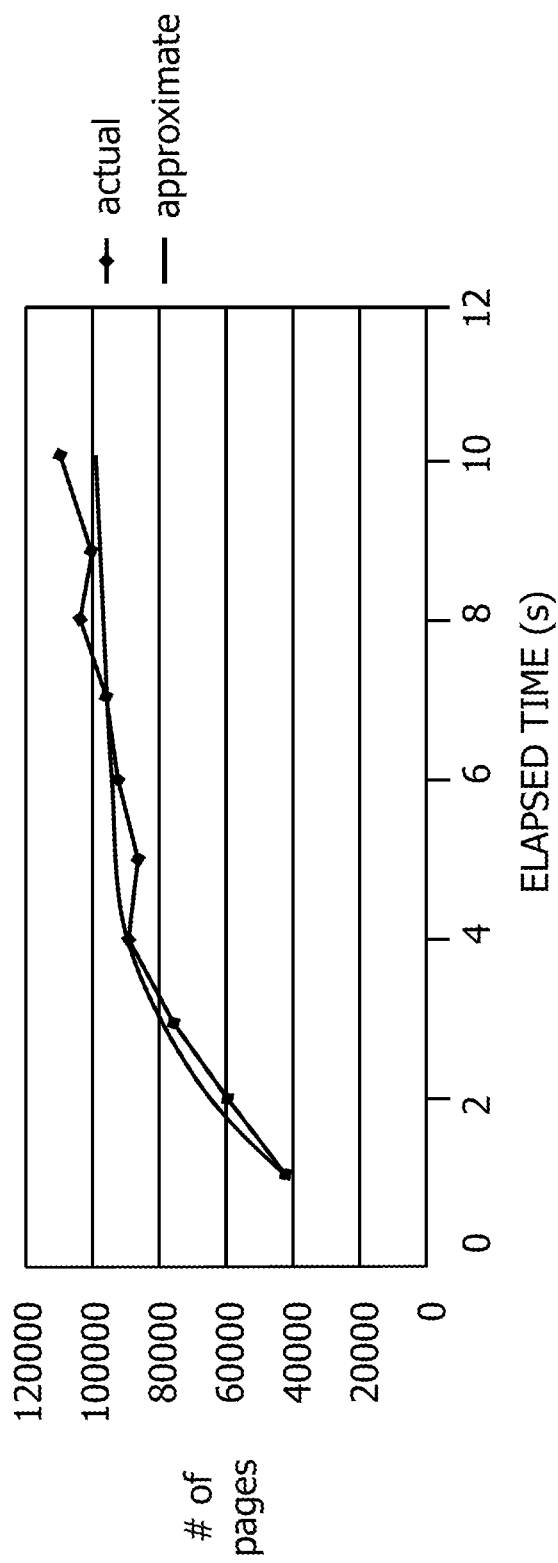
FIG. 17 is a graph indicating an update page quantity of a DB server in Non-Patent document 2.
FIG. 18 is a diagram illustrating an approximate equation to express an "approximate" graph in FIG. 17.

To begin with, the first item, i.e., (a) the page update speed in the specific application is estimated. The estimation of the page update speed utilized an examination result of the page update speed when running a database (DB) server (and a load server), which is disclosed in an article titled "Design and Evaluation of a Virtual Machine Migration using RDMA Data Transfer Mechanism over 10 Gb Ethernet" (Non-Patent document 2). FIG. 17 is a graph depicting an update page quantity of the DB server in the Non-Patent document 2 (refer to FIG. 15 on P10 of the Non-Patent document 2). The evaluation in the graph of FIG. 17 was made under such a condition that a processor is Opteron 254 (2.8 GHz), a memory capacity is 4 GB, and an on-memory database is used (refer to Table 1 on P3 of the Non-Patent document 2). In execution of an evaluation target application, an axis of abscissa indicates elapsed time, and an axis of ordinate indicates an update page count in the graph of FIG. 17. The update of the same page was counted one. FIG. 18 illustrates an approximate equation to express an "approximate" graph in FIG. 17. Supposing that the page is accessed entirely at random, an update page count D is expressed in relation to a time elapse t by the approximate equation in FIG. 18.

Figure 19:
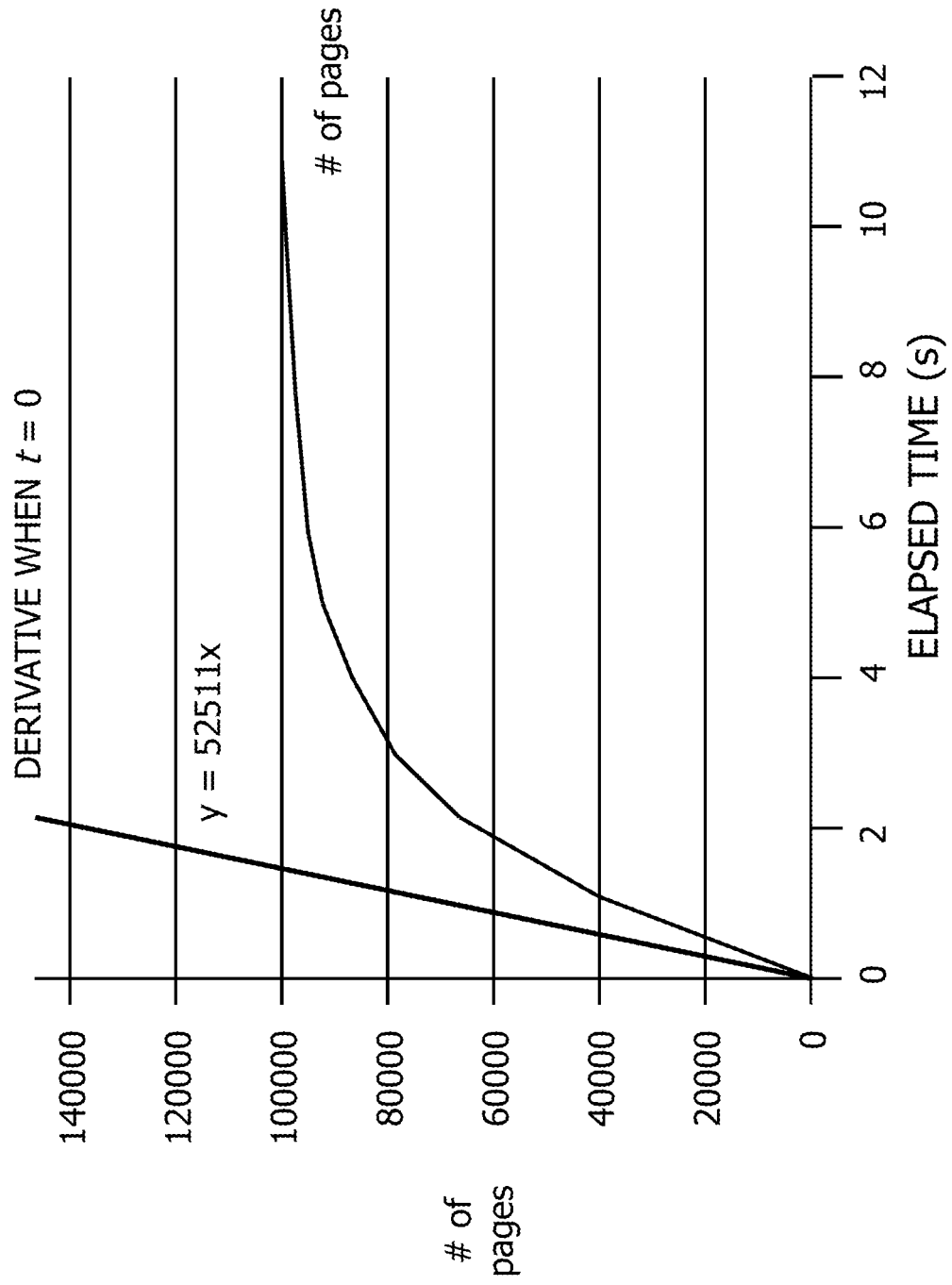
FIG. 19 is a graph indicating a page update speed when t=0 in the approximate equation in FIG. 18.

Herein, the page update speed desired to be obtained is a page update speed given in the case of counting the update of the same page respectively. The page update speed given in the case of respectively counting corresponds to a gradient of the graph when t=0, e.g., there is not any updated page, and is a value of a derivative when t=0, the derivative obtained by differentiating a function of the approximate equation in FIG. 18. From a result of the graph in FIG. 17, the page update speed of the evaluation target application becomes approximately 52511 pages/sec. FIG. 19 is a graph indicating the page update speed when t=0 in the approximate equation in FIG. 18. In FIG. 19, a gradient of a tangential line when t=0 indicates the page update speed "52511 pages/sec" when t=0 with respect to the derivative of the approximate equation in FIG. 18.

An evaluation environment of the Non-Patent document 2 is that the page size is 4 KB, and a 400 MB memory is used. On the other hand, the Example 2 is based on assumption that the page size is 2 MB, and the memory having a capacity of about 200 GB is used, however, a rate of the page size to the memory (memory capacity) to be used is approximately equal to the rate given in the evaluation environment of the Non-Patent document 2, and hence the page update speed is considered to be approximately equal.

Accordingly, in the estimation of the system effect, the page update speed for the local memory is to be "52511 pages/sec". At this time, page access time per page with respect to the pages on the local memory is given such as 1/52511 sec=19 μsec.

Next, the page transfer time per one time in the second item (b) is estimated. A measured value of the page transfer time in the case of transferring 2 MB data as a page size through a Read (Write) function of RDMA (Remote Direct Memory Access), is approximately 660 μsec. The CPU used for the measurement is Intel Xeon X5570, a capacity of a RAM (Random Access Memory) is 24 GB, OS is RHEL5.4, and HCA (Host Channel Adapter) is Mellanox QDR (ConnectX).

Figure 20:
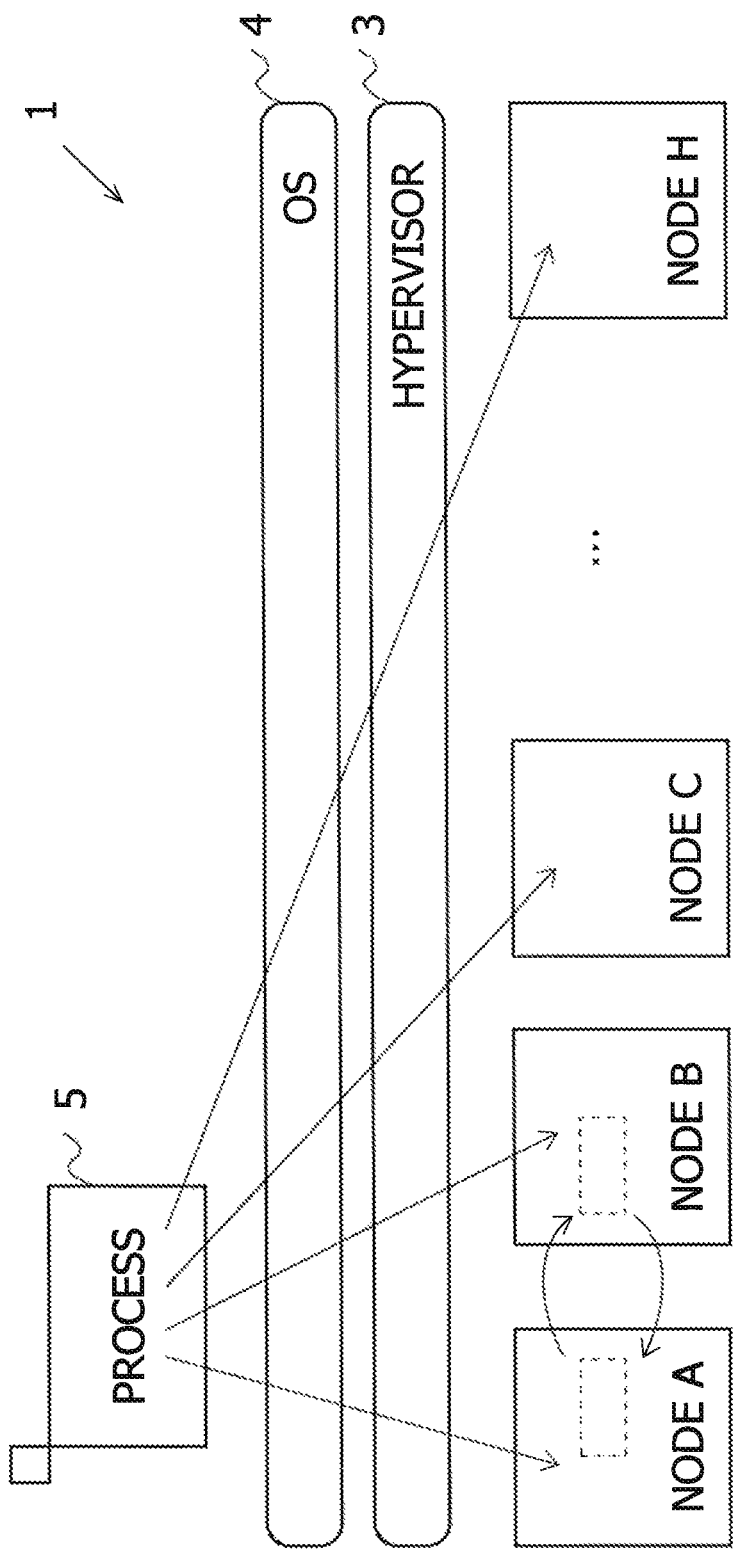
FIG. 20 is a diagram illustrating an example of the information processing system including eight nodes.

Moreover, the average page access processing time on the distributed shared memory system in the third item (c) is estimated. Herein, the estimation is conducted about the information system including 8 nodes. Further, the average page access processing time connotes a period of time obtained by adding an average value of the page transfer time to the page access time per page. FIG. 20 is a diagram illustrating an example of the information processing system 1 including the 8 nodes. In FIG. 20, it is assumed that an information processing system 1 is the distributed shared memory system and includes the 8 nodes. Supposing that each page is accessed randomly during the execution of the evaluation target application, the page fault, i.e., the access to the remote node occurs with a probability given by (Node Count −1)/(Node Count). In the example of FIG. 20, the access to the remote node occurs with a probability "⅞". Upon the occurrence of the access to the remote node, the page update is performed through the communication. Note that the system effect was estimated in a model of not having any copy of the pages to expel the oldest page of the local node in the case of acquiring the page from the remote node.

Herein, (a) the page access time per page with respect to the pages on the local memory proves to be 19 μsec from the result of estimating the page update speed in the specific application. Further, (b) the page transfer time proves to be 660 μsec from the result of estimating the page transfer time per one time. The access to the remote node occurs with the probability "⅞", and hence the average value of the page transfer time is given by 660×⅞ μsec. Accordingly, the average page access processing time on the distributed shared memory system can be estimated such as 19+660×⅞ μsec.

Moreover, the estimation of the power reduction effect by the DVFS in the fourth item (d) is made. FIG. 21 is a graph illustrating the power reduction effect by the DVFS. The frequency being decreased, the power consumption of the CPU is reduced by about 52%. The CPU used for the measurement is Intel Xeon (SDB), the capacity of the RAM is 24 GB, and the OS is CentOS 6. A quantity of the power consumption of the CPU was calculated by a CPU power consumption quantity measuring function (RAPL: Running Average Power Limiting) possessed by the CPU.

The results of estimating the effects in the Each-Time method and the Scheduler method will be describe based on the estimations in the four items described above. Note that these estimations are not to take account of the idle time of the CPU.

The power reduction effect by the Each-Time method is obtained by: ((Average Value of Page Transfer Time)/(Average Page Access Processing Time))×(Power Reduction Rate). Namely, the Each-Time method obtains the power reduction effect of about 50% at the maximum by the following calculation:

$$((660 \times 7/8)/(19+660 \times 7/8)) \times 0.52 \approx 50(\%)$$

In the Scheduler method, a rate of how much the processing time excluding the communication occupies the average page access processing time is the converted CPU usage rate. In this estimation, the processing time excluding the communication is 19 μsec as the page access time to the page on the local memory. Therefore, the converted CPU usage rate is about 3.2% in average by the following calculation:

$$(19/(19+660 \times 7/8)) \times 100 \approx 3.2(\%) \ldots (*)$$

When the CPU usage rate is 3.2%, CentOS 5.3 as the OS used for the estimation sets by default the lowest CPU clock frequency in the CPU clock frequencies that can be set, in which case the power is saved.

In one environmental example of the Scheduler method, a percentage "80%" is set as the threshold value, and, if the CPU usage rate is smaller than 80%, the CPU clock frequency is set to the lowest frequency that can be set. If the CPU usage rate is equal to or larger than 80%, the CPU clock frequency is set to the highest frequency that can be set.

In the calculation formula (*) of the CPU usage rate, let t be the page access time to the page on the local memory and s be the average value of the page transfer time, and the CPU usage rate can be obtained by the following calculation formula:

$$t/(t+s) \times 100$$

Herein, the page access time t to the page on the local memory differs depending on the application to be executed. Further, the average value s of the page transfer time differs depending on the page size of the page to be transferred, the capacity of the memory to be used and communication performance of the interconnect. Accordingly, if the page access time t to the page on the local memory is small as compared to the average value s of the page transfer time, the CPU usage rate becomes much lower. Whereas if the page access time t to the page on the local memory is large as compared to the average value s of the page transfer time, the CPU usage rate becomes much higher. Therefore, in the Scheduler method, if the page access time t to the page on the local memory is small as compared to the average page transfer time s, the CPU usage rate decreases below the threshold value and the CPU clock frequency is then varied to a low value, thereby yielding the power reduction effect.

According to the technology of the disclosure, the information processing apparatus can save the electric power of the arithmetic processing device while restraining the decrease in performance of the arithmetic processing device by controlling the clock frequency or the voltage of the arithmetic processing device on the basis of the detection of the exception when accessing a main memory possessed by the another information processing apparatus.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus comprising:
a first memory; and
a processor coupled to the first memory and programmed to execute:
requesting data on a second memory possessed by another information processing apparatus when the data is not stored in the first memory;
calculating a usage rate of the processor by deeming the processor idle in case of the requesting to acquiring the data; and
varying a clock frequency of the processor or a voltage of the processor after the requesting, when the usage rate of the processor is smaller than a threshold value.

2. An information processing system comprising a plurality of information processing apparatuses, one information processing apparatus connected to another information processing apparatus of the plurality of information processing apparatuses includes:
- a first memory; and
- a processor coupled to the first memory and programmed to execute:
- requesting data on a second memory possessed by the another information processing apparatus when the data is not stored in the first memory;
- calculating a usage rate of the processor by deeming the processor idle in case of the requesting to acquiring the data; and
- varying a clock frequency of the processor or a voltage of the processor after the requesting, when the usage rate of the processor is smaller than a threshold value.

3. A control method for an information processing system including a plurality of information processing apparatuses, the control method comprising:
- requesting, by a processor of one information processing apparatus connected to another information processing apparatus of the plurality of information processing apparatuses and coupled to a first memory, data on a second memory possessed by the another information processing apparatus when the data is not stored in the first memory;
- calculating a usage rate of the processor by deeming the processor idle in case of the requesting to acquiring the data; and
- varying, by the processor, a clock frequency of the processor or a voltage of the processor after the requesting, when the usage rate of the processor is smaller than a threshold value.

* * * * *